US012677241B2

(12) United States Patent
Duan et al.

(10) Patent No.: US 12,677,241 B2
(45) Date of Patent: Jul. 7, 2026

(54) RECONFIGURABLE INTELLIGENT SURFACE (RIS) BEAM SWEEPING OF SOUNDING REFERENCE SIGNAL (SRS) FOR ANGLE OF DEPARTURE (AOD) BASED POSITIONING

(71) Applicant: QUALCOMM Incorporated, San Diego, CA (US)

(72) Inventors: Weimin Duan, San Diego, CA (US); Alexandros Manolakos, Escondido, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 280 days.

(21) Appl. No.: 18/557,498

(22) PCT Filed: Mar. 29, 2022

(86) PCT No.: PCT/US2022/071416
§ 371 (c)(1),
(2) Date: Oct. 26, 2023

(87) PCT Pub. No.: WO2022/261576
PCT Pub. Date: Dec. 15, 2022

(65) Prior Publication Data
US 2024/0244564 A1 Jul. 18, 2024

(30) Foreign Application Priority Data
Jun. 9, 2021 (GR) .............................. 20210100379

(51) Int. Cl.
*H04W 64/00* (2009.01)

(52) U.S. Cl.
CPC .................................. *H04W 64/00* (2013.01)

(58) Field of Classification Search
CPC .... H04L 5/0048; H04W 64/00; H04W 24/10; H04W 64/003; H04B 7/04013
See application file for complete search history.

(56) References Cited

U.S. PATENT DOCUMENTS

| | | | |
|---|---|---|---|
| 11,032,048 B2 | 6/2021 | Manolakos | |
| 2015/0016379 A1 | 1/2015 | Nam et al. | |
| 2016/0006553 A1 | 1/2016 | Kim et al. | |
| 2017/0366311 A1* | 12/2017 | Iyer ...................... | H04B 7/0482 |

(Continued)

FOREIGN PATENT DOCUMENTS

| | | |
|---|---|---|
| CN | 111245494 A | 6/2020 |
| WO | WO-2018071026 A1 | 4/2018 |

(Continued)

OTHER PUBLICATIONS

Huawei., et al., "Considerations on Other Enhancements for Positioning Accuracy", R1-2101252, 3GPP TSG RAN WG1 Meeting #104-e, 3rd Generation Partnership Project, Mobile Competence Centre, 650, Route Des Lucioles, F-06921 Sophia-Antipolis Cedex, France, vol. RAN WG1, No. E-meeting, Jan. 25, 2021-Feb. 5, 2021, Jan. 19, 2021, XP051971462, 5 Pages.

(Continued)

*Primary Examiner* — Mahran Y Abu Roumi
(74) *Attorney, Agent, or Firm* — Thien T. Nguyen

(57) ABSTRACT
Disclosed are techniques for wireless communication. In an aspect, a user equipment (UE) may obtain configuration information that identifies resources for sounding reference signal (SRS) positioning. The UE may transmit, to a reconfigurable intelligent surface (RIS), a plurality of SRS transmissions at different times according to the configuration information. The UE may receive, from the RIS, a plurality of SRS transmissions comprising reflections of the plurality of SRS transmissions to the RIS, wherein each of the plurality of SRS transmissions from the RIS is transmitted at a different angle of departure (AoD) from the RIS. The UE may measure each of the plurality of SRS transmissions (Continued)

from the RIS to produce a plurality of measurements. The UE may perform a positioning operation based on the plurality of measurements.

50 Claims, 20 Drawing Sheets

(56)                    References Cited

U.S. PATENT DOCUMENTS

| | | | | |
|---|---|---|---|---|
| 2018/0062724 A1 * | 3/2018 | Onggosanusi | ........ | H04L 5/0055 |
| 2021/0306220 A1 * | 9/2021 | Xu | ........................ | H04L 5/0051 |
| 2022/0046691 A1 * | 2/2022 | Kim | ..................... | H04L 5/0055 |
| 2024/0048307 A1 * | 2/2024 | Duan | .................... | H04L 5/0048 |
| 2025/0274165 A1 * | 8/2025 | Manolakos | ......... | H04L 25/0224 |

FOREIGN PATENT DOCUMENTS

| | | |
|---|---|---|
| WO | WO-2019222491 | 11/2019 |
| WO | WO-2020066103 A1 | 4/2020 |
| WO | WO-2021095181 A1 | 5/2021 |

OTHER PUBLICATIONS

International Search Report and Written Opinion—PCT/US2022/ 071416—ISA/EPO—Jul. 15, 2022.
Wymeersch H., et al., "Radio Localization and Mapping With Reconfigurable Intelligent Surfaces", Arxiv.org, Cornell University Library, 201 Olin Library Cornell University, Ithaca, NY 14853, Jun. 11, 2020, XP081681498, 9 Pages, Figure 4.

* cited by examiner

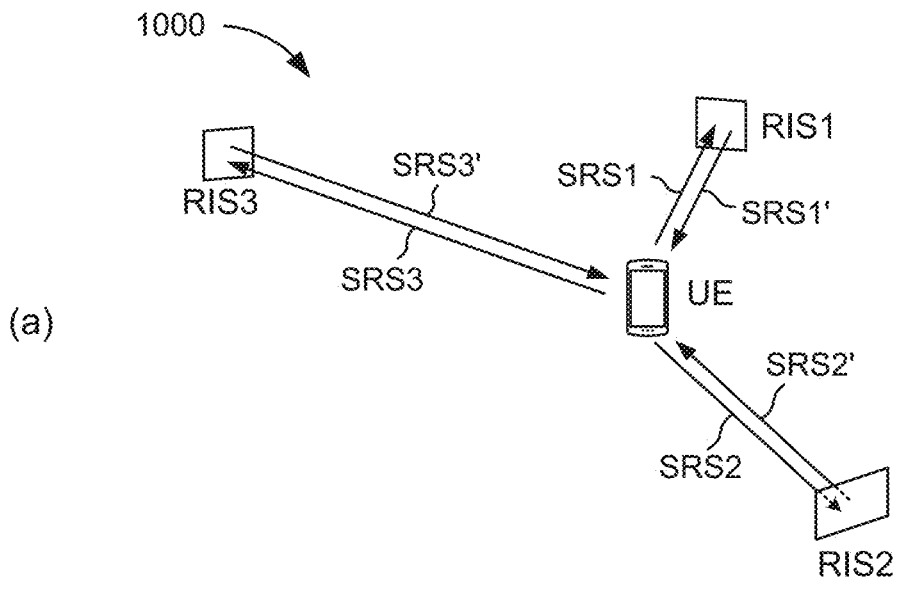
(a)
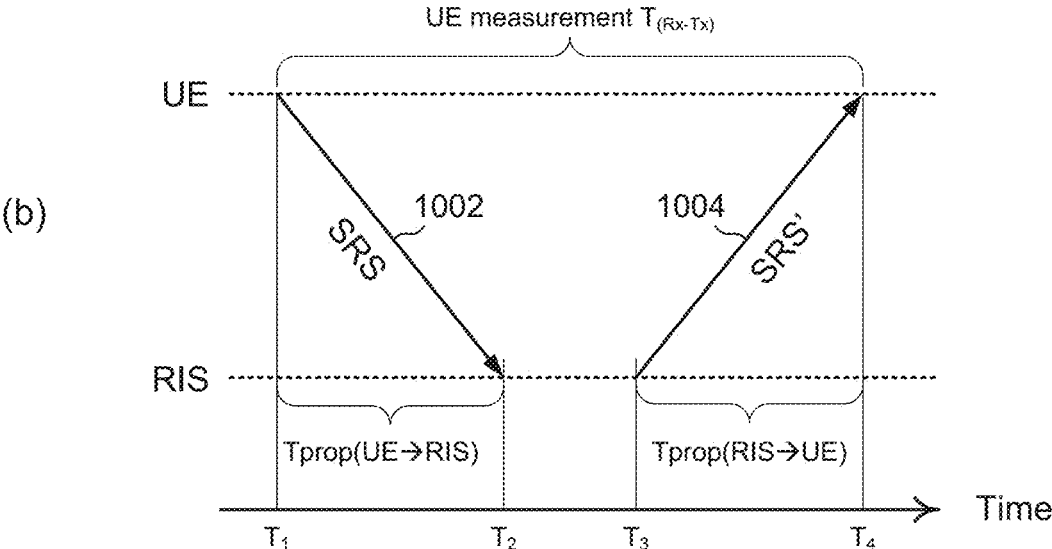
(b)
*FIG. 10*

1100 —

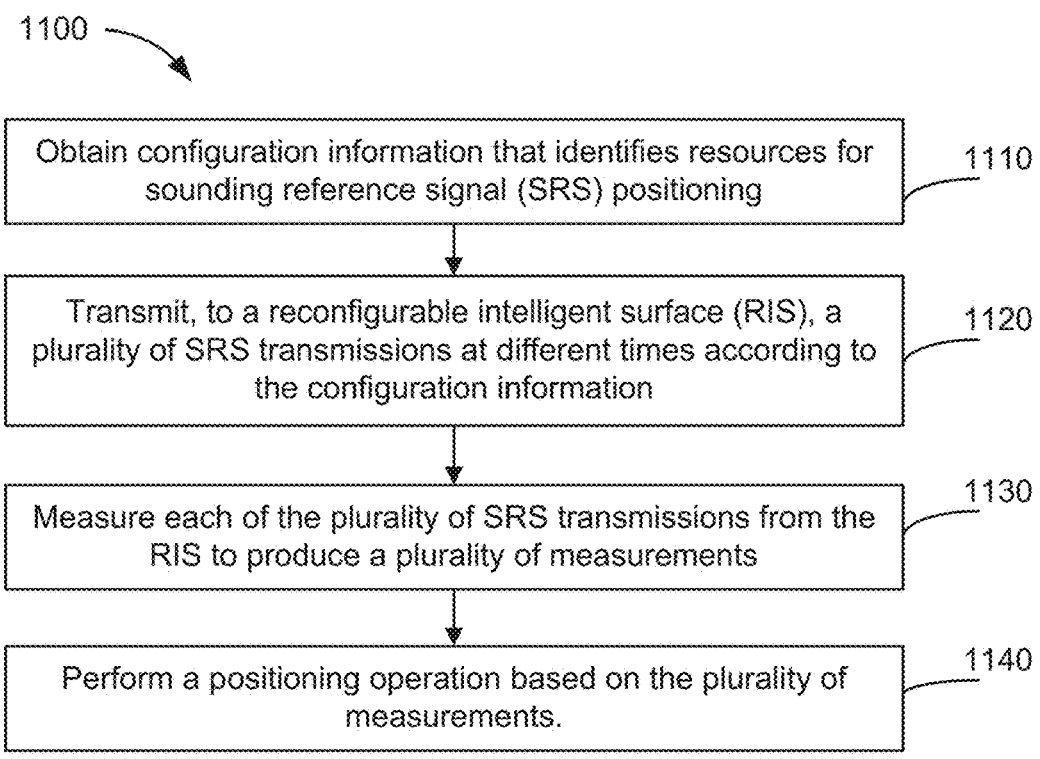

Obtain configuration information that identifies resources for sounding reference signal (SRS) positioning — 1110

Transmit, to a reconfigurable intelligent surface (RIS), a plurality of SRS transmissions at different times according to the configuration information — 1120

Measure each of the plurality of SRS transmissions from the RIS to produce a plurality of measurements — 1130

Perform a positioning operation based on the plurality of measurements. — 1140

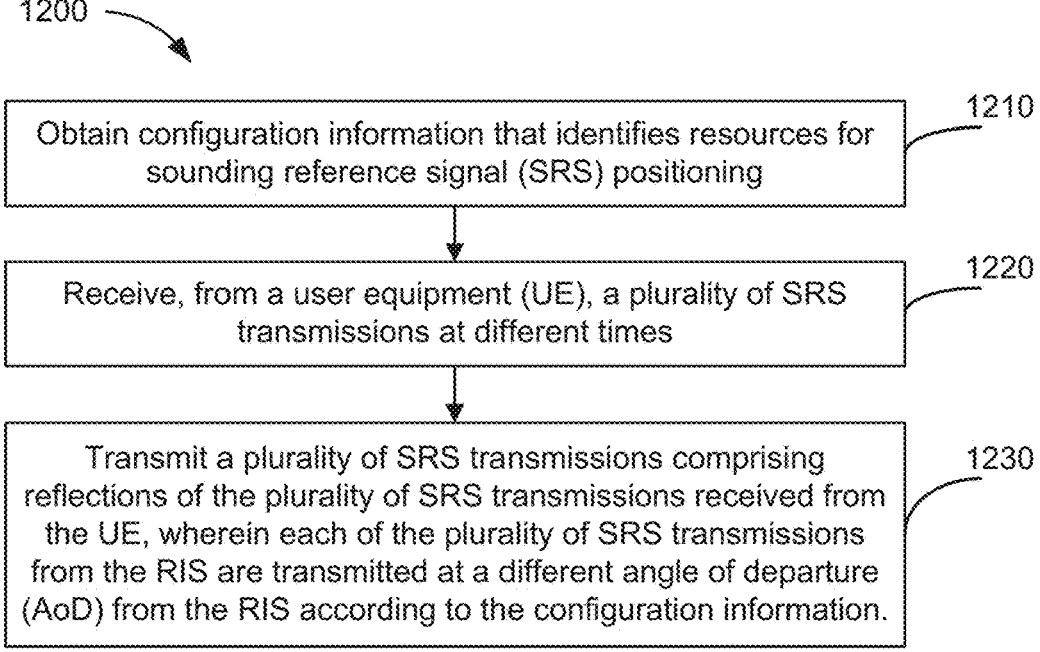

Obtain configuration information that identifies resources for sounding reference signal (SRS) positioning — 1210

Receive, from a user equipment (UE), a plurality of SRS transmissions at different times — 1220

Transmit a plurality of SRS transmissions comprising reflections of the plurality of SRS transmissions received from the UE, wherein each of the plurality of SRS transmissions from the RIS are transmitted at a different angle of departure (AoD) from the RIS according to the configuration information. — 1230

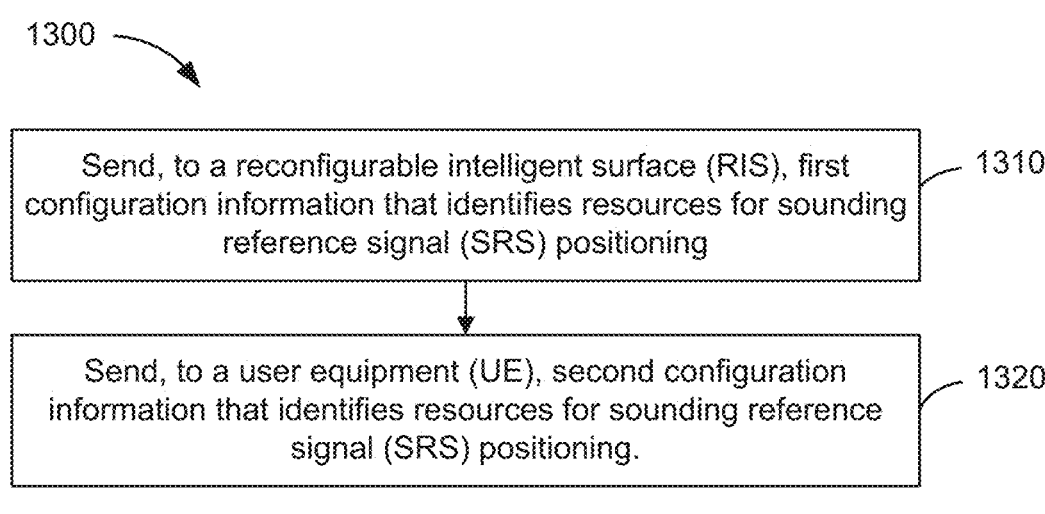

| Send, to a reconfigurable intelligent surface (RIS), first configuration information that identifies resources for sounding reference signal (SRS) positioning | 1310 |

| Send, to a user equipment (UE), second configuration information that identifies resources for sounding reference signal (SRS) positioning. | 1320 |

*FIG. 13A*

Send, to the UE, assistance data that comprises a geographic location of the RIS, an orientation of the RIS, characteristics of the reflected SRS beams, ... — 1330

Receive, from the UE, a set or RSRP measurements of reflected SRS beams transmitted by the RIS — 1340

Determine an Angle of Departure (AoD) of the UE from the RIS based on the RSRP measurements — 1350

Estimate a location of the UE based on the AoD — 1360

Send the location estimate to the UE — 1370

*FIG. 13B*

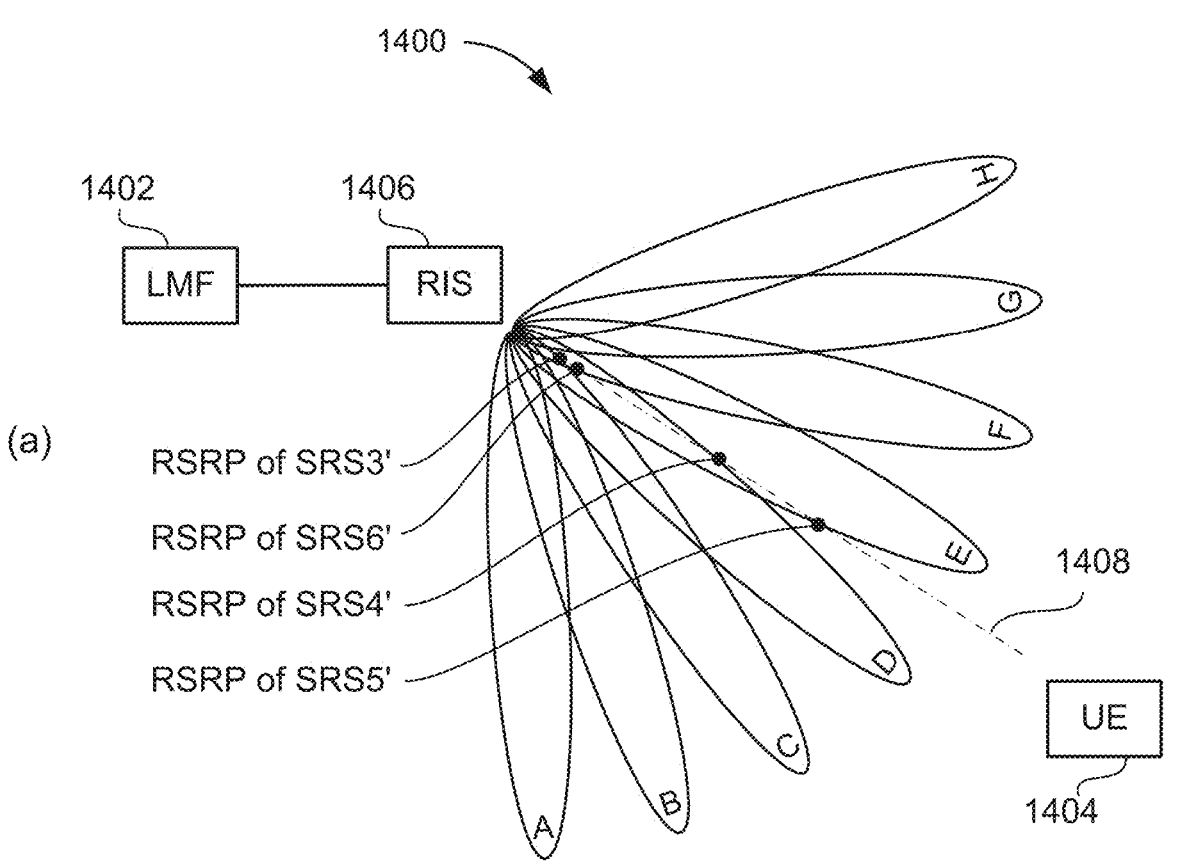
(a)
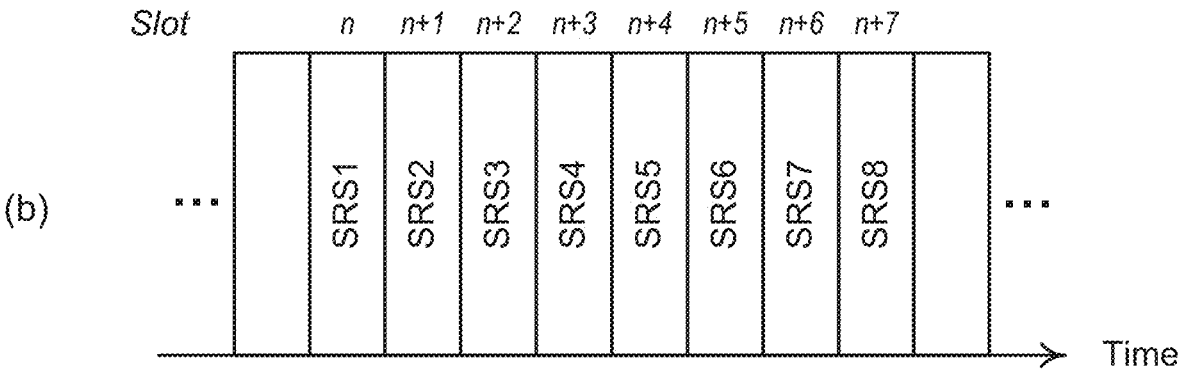
(b)
*FIG. 14*

1

RECONFIGURABLE INTELLIGENT SURFACE (RIS) BEAM SWEEPING OF SOUNDING REFERENCE SIGNAL (SRS) FOR ANGLE OF DEPARTURE (AOD) BASED POSITIONING

CROSS-REFERENCE TO RELATED APPLICATIONS

The present application for Patent claims the benefit of GR Application No. 20210100379, entitled "RECONFIG-URABLE INTELLIGENT SURFACE (RIS) BEAM SWEEPING OF SOUNDING REFERENCE SIGNAL (SRS) FOR ANGLE OF DEPARTURE (AOD) BASED POSITIONING", filed Jun. 9, 2021, and is a national stage application, filed under 35 U.S.C. § 371, of International Patent Application No. PCT/US2022/071416, entitled, "RECONFIGURABLE INTELLIGENT SURFACE (RIS) BEAM SWEEPING OF SOUNDING REFERENCE SIG-NAL (SRS) FOR ANGLE OF DEPARTURE (AOD) BASED POSITIONING", filed Mar. 29, 2022, both of which are assigned to the assignee hereof and are expressly incorporated herein by reference in their entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes obtaining configuration information that identifies resources for sounding reference signal (SRS) positioning; transmitting, to a reconfigurable intelligent surface (RIS), a plurality of SRS transmissions at different times according to the configuration information: receiving, from the RIS, a plurality of SRS transmissions comprising reflections of the plurality of SRS transmissions to the RIS, wherein each of the plurality of SRS transmissions from the RIS is transmitted at a different angle of departure (AoD) from the RIS; measuring each of the plurality of SRS transmissions from the RIS to produce a plurality of measurements; and performing a positioning operation based on the plurality of measurements.

In an aspect, a method of wireless communication performed by a reconfigurable intelligent surface (RIS) includes obtaining configuration information that identifies resources for sounding reference signal (SRS) positioning; receiving, from a user equipment (UE), a plurality of SRS transmissions at different times, and transmitting a plurality of SRS transmissions comprising reflections of the plurality of SRS transmissions received from the UE, wherein each of the plurality of SRS transmissions from the RIS are transmitted at a different angle of departure (AoD) from the RIS according to the configuration information.

In an aspect, a method of wireless communication performed by a location server includes sending, to a reconfigurable intelligent surface (RIS), first configuration information that identifies resources for sounding reference signal (SRS) positioning; and sending, to a user equipment (UE), second configuration information that identifies resources for sounding reference signal (SRS) positioning, wherein each of the first configuration information and the second configuration information indicates a number of SRS resources, a time for the UE to transmit an SRS transmission to the RIS, an expected time for the UE to receive a reflection of an SRS transmission from the RIS, an uncertainty of an expected time for the UE to receive a reflection of an SRS transmission from the RIS, an angle of departure (AoD) at which the RIS transmits a reflection of an SRS transmission from the UE, or combinations thereof.

In an aspect, a user equipment (UE) includes a memory; at least one transceiver; and at least one processor communicatively coupled to the memory and the at least one transceiver, the at least one processor configured to: obtain configuration information that identifies resources for sounding reference signal (SRS) positioning; transmit, via the at least one transceiver, to a reconfigurable intelligent surface (RIS), a plurality of SRS transmissions at different times according to the configuration information: receive, via the at least one transceiver, from the RIS, a plurality of SRS transmissions comprising reflections of the plurality of SRS transmissions to the RIS, wherein each of the plurality of SRS transmissions from the RIS is transmitted at a different angle of departure (AoD) from the RIS; measure each of the plurality of SRS transmissions from the RIS to produce a plurality of measurements; and perform a positioning operation based on the plurality of measurements.

In an aspect, a reconfigurable intelligent surface (RIS) includes a memory; at least one transceiver; and at least one processor communicatively coupled to the memory and the at least one transceiver, the at least one processor configured to: obtain configuration information that identifies resources for sounding reference signal (SRS) positioning, receive, via the at least one transceiver, from a user equipment (UE), a plurality of SRS transmissions at different times; and transmit, via the at least one transceiver, a plurality of SRS transmissions comprising reflections of the plurality of SRS transmissions received from the UE, wherein each of the plurality of SRS transmissions from the RIS are transmitted at a different angle of departure (AoD) from the RIS according to the configuration information.

In an aspect, a location server includes a memory; at least one transceiver; and at least one processor communicatively coupled to the memory and the at least one transceiver, the at least one processor configured to: send, via the at least one transceiver, to a reconfigurable intelligent surface (RIS), first configuration information that identifies resources for sounding reference signal (SRS) positioning; and send, via the at least one transceiver, to a user equipment (UE), second configuration information that identifies resources for sounding reference signal (SRS) positioning, wherein each of the first configuration information and the second configuration information indicates a number of SRS resources, a time for the UE to transmit an SRS transmission to the RIS, an expected time for the UE to receive a reflection of an SRS transmission from the RIS, an uncertainty of an expected time for the UE to receive a reflection of an SRS transmission from the RIS, an angle of departure (AoD) at which the RIS transmits a reflection of an SRS transmission from the UE, or combinations thereof.

In an aspect, a user equipment (UE) includes means for obtaining configuration information that identifies resources for sounding reference signal (SRS) positioning; means for transmitting, to a reconfigurable intelligent surface (RIS), a plurality of SRS transmissions at different times according to the configuration information; means for receiving, from the RIS, a plurality of SRS transmissions comprising reflections of the plurality of SRS transmissions to the RIS, wherein each of the plurality of SRS transmissions from the RIS is transmitted at a different angle of departure (AoD) from the RIS; means for measuring each of the plurality of SRS transmissions from the RIS to produce a plurality of measurements; and means for performing a positioning operation based on the plurality of measurements.

In an aspect, a reconfigurable intelligent surface (RIS) includes means for obtaining configuration information that identifies resources for sounding reference signal (SRS) positioning; means for receiving, from a user equipment (UE), a plurality of SRS transmissions at different times; and means for transmitting a plurality of SRS transmissions comprising reflections of the plurality of SRS transmissions received from the UE, wherein each of the plurality of SRS transmissions from the RIS are transmitted at a different angle of departure (AoD) from the RIS according to the configuration information.

In an aspect, a location server includes means for sending, to a reconfigurable intelligent surface (RIS), first configuration information that identifies resources for sounding reference signal (SRS) positioning; and means for sending, to a user equipment (UE), second configuration information that identifies resources for sounding reference signal (SRS) positioning, wherein each of the first configuration information and the second configuration information indicates a number of SRS resources, a time for the UE to transmit an SRS transmission to the RIS, an expected time for the UE to receive a reflection of an SRS transmission from the RIS, an uncertainty of an expected time for the UE to receive a reflection of an SRS transmission from the RIS, an angle of departure (AoD) at which the RIS transmits a reflection of an SRS transmission from the UE, or combinations thereof.

In an aspect, a non-transitory computer-readable medium storing computer-executable instructions that, when executed by a user equipment (UE), cause the UE to: obtain configuration information that identifies resources for sounding reference signal (SRS) positioning; transmit, to a reconfigurable intelligent surface (RIS), a plurality of SRS transmissions at different times according to the configuration information: receive, from the RIS, a plurality of SRS transmissions comprising reflections of the plurality of SRS transmissions to the RIS, wherein each of the plurality of SRS transmissions from the RIS is transmitted at a different angle of departure (AoD) from the RIS; measure each of the plurality of SRS transmissions from the RIS to produce a plurality of measurements; and perform a positioning operation based on the plurality of measurements.

In an aspect, a non-transitory computer-readable medium storing computer-executable instructions that, when executed by a reconfigurable intelligent surface (RIS), cause the RIS to: obtain configuration information that identifies resources for sounding reference signal (SRS) positioning, receive, from a user equipment (UE), a plurality of SRS transmissions at different times; and transmit a plurality of SRS transmissions comprising reflections of the plurality of SRS transmissions received from the UE, wherein each of the plurality of SRS transmissions from the RIS are transmitted at a different angle of departure (AoD) from the RIS according to the configuration information.

In an aspect, a non-transitory computer-readable medium storing computer-executable instructions that, when executed by a location server, cause the location server to: send, to a reconfigurable intelligent surface (RIS), first configuration information that identifies resources for sounding reference signal (SRS) positioning; and send, to a user equipment (UE), second configuration information that identifies resources for sounding reference signal (SRS) positioning, wherein each of the first configuration information and the second configuration information indicates a number of SRS resources, a time for the UE to transmit an SRS transmission to the RIS, an expected time for the UE to receive a reflection of an SRS transmission from the RIS, an uncertainty of an expected time for the UE to receive a reflection of an SRS transmission from the RIS, an angle of departure (AoD) at which the RIS transmits a reflection of an SRS transmission from the UE, or combinations thereof.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 10 illustrates a system 1000 for multi-RTT positioning using uplink (UL) sounding reference signals (SRSs) and multiple reconfigurable intelligent surfaces (RISs).

FIG. 11 is a flowchart of an example processes associated with RIS beam sweeping of SRS for angle of departure (AoD) based positioning according to aspects of the disclosure.

FIG. 12 is a flowchart of an example processes associated with RIS beam sweeping of SRS for angle of departure (AoD) based positioning according to aspects of the disclosure.

FIGS. 13A and 13B are flowcharts of an example processes associated with RIS beam sweeping of SRS for angle of departure (AoD) based positioning according to aspects of the disclosure.

FIG. 14 illustrates an example network implementing a UE-based positioning with a single RIS according to some aspects of the disclosure.

DETAILED DESCRIPTION

Figure 1:
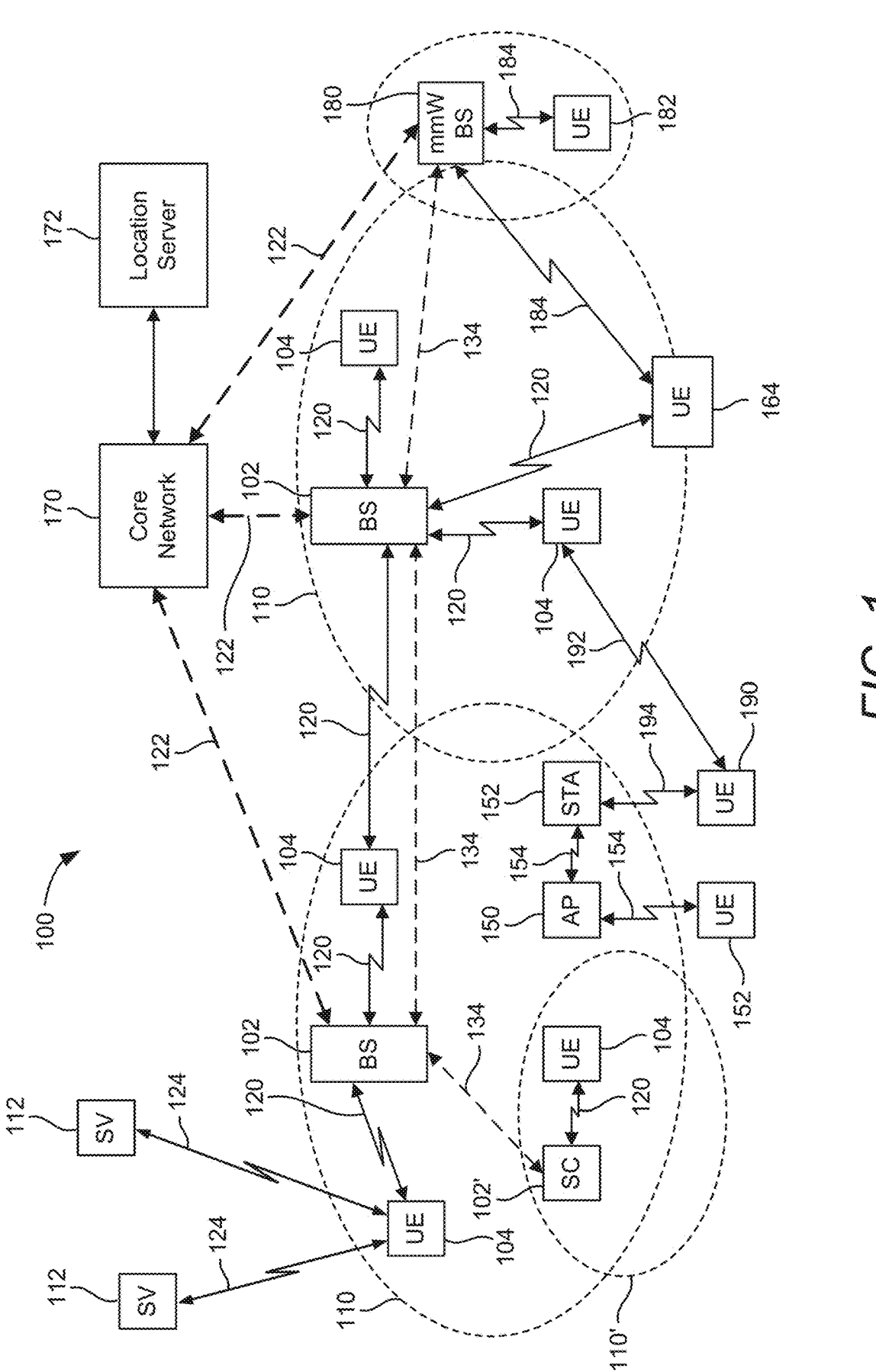
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server, via another network, such as via a Wi-Fi access point, and so on. For signaling purposes, communication between a UE 104 and a location server 172 may be represented as a direct connection, with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace. RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen-before-talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2), mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "Cell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals 124 may include SPS, SPS-like, and/or other signals associated with such one or more SPS.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
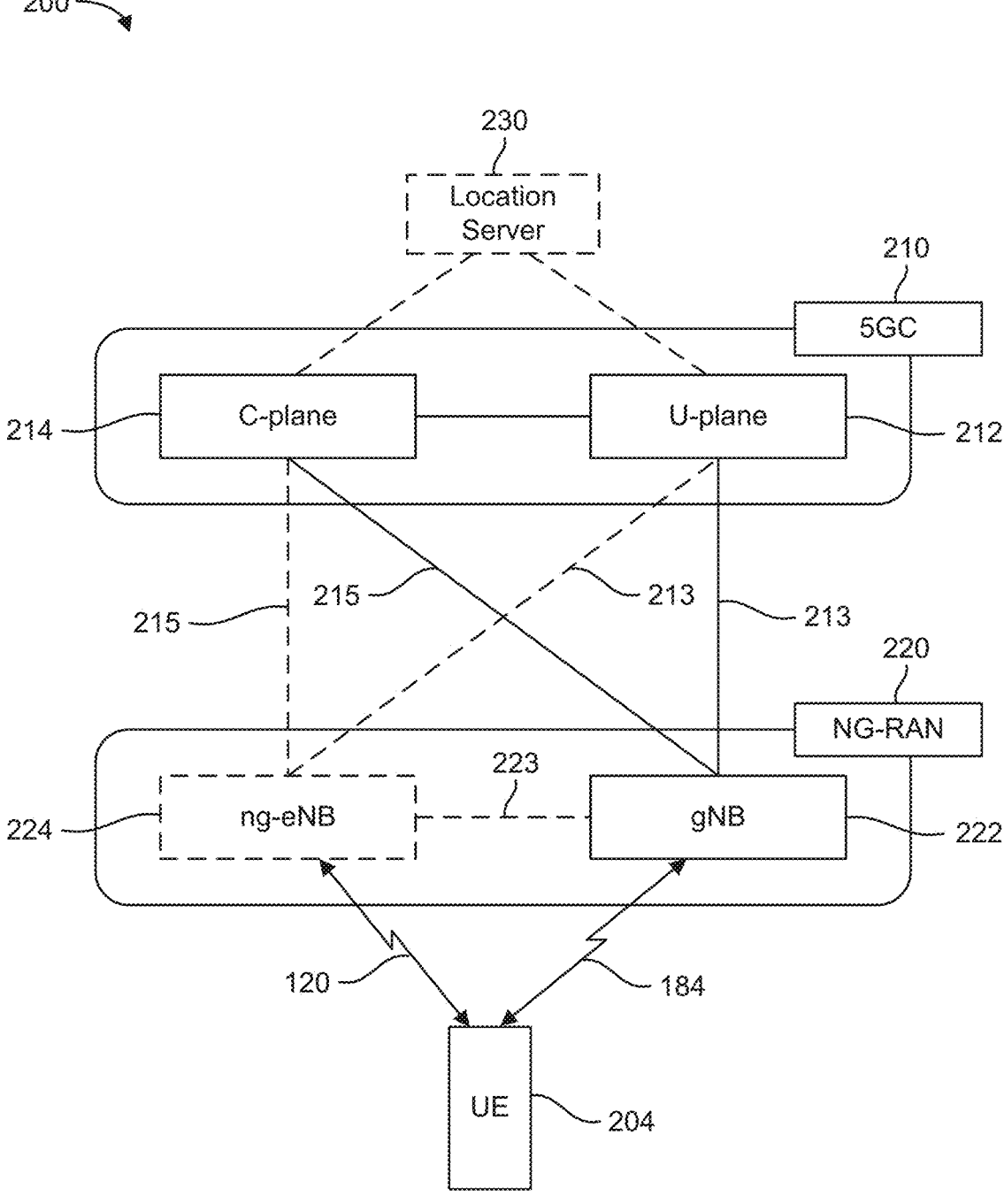
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third-party server, such as an original equipment manufacturer (OEM) server or service server).

Figure 2B:
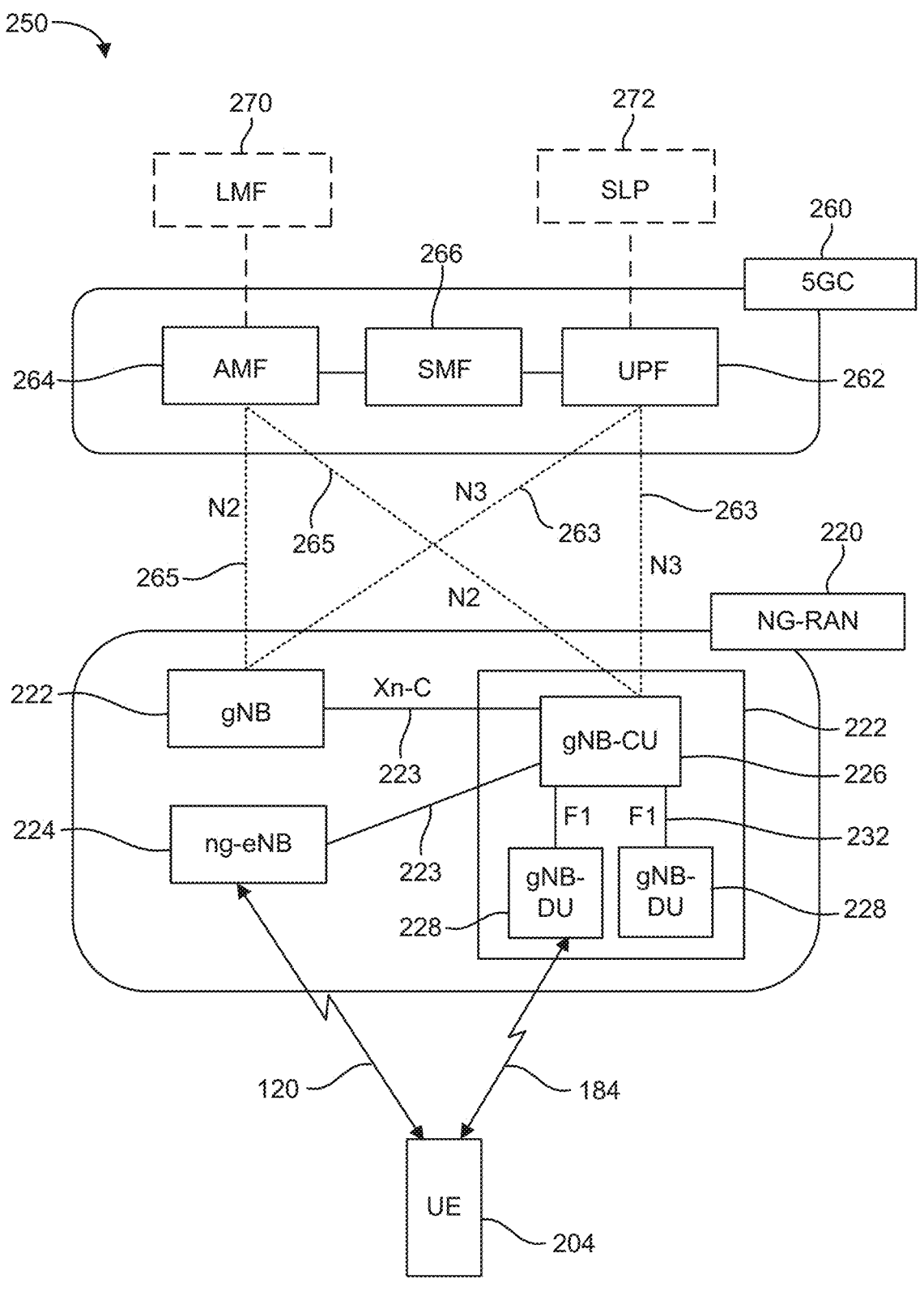

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F1" interface. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), medium access control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SDAP, and PDCP layers and with a gNB-DU 228 via the RLC, MAC, and PHY layers.

Figure 3A:
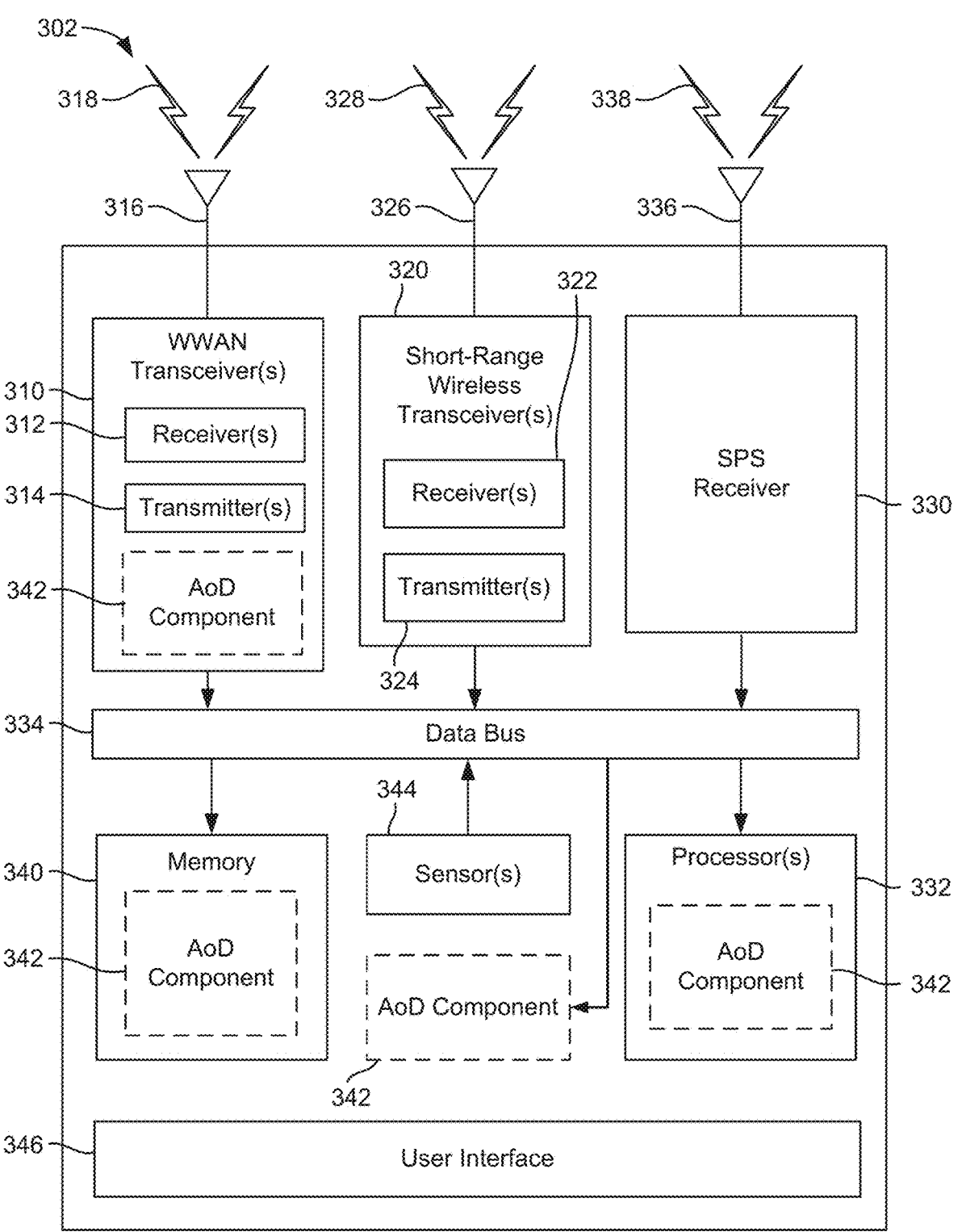
FIGS. 3A, 3B, and 3C are simplified block diagrams of several sample aspects of components that may be employed in a user equipment (UE), a base station, and a network entity, respectively, and configured to support communications as taught herein.
Figure 3B:
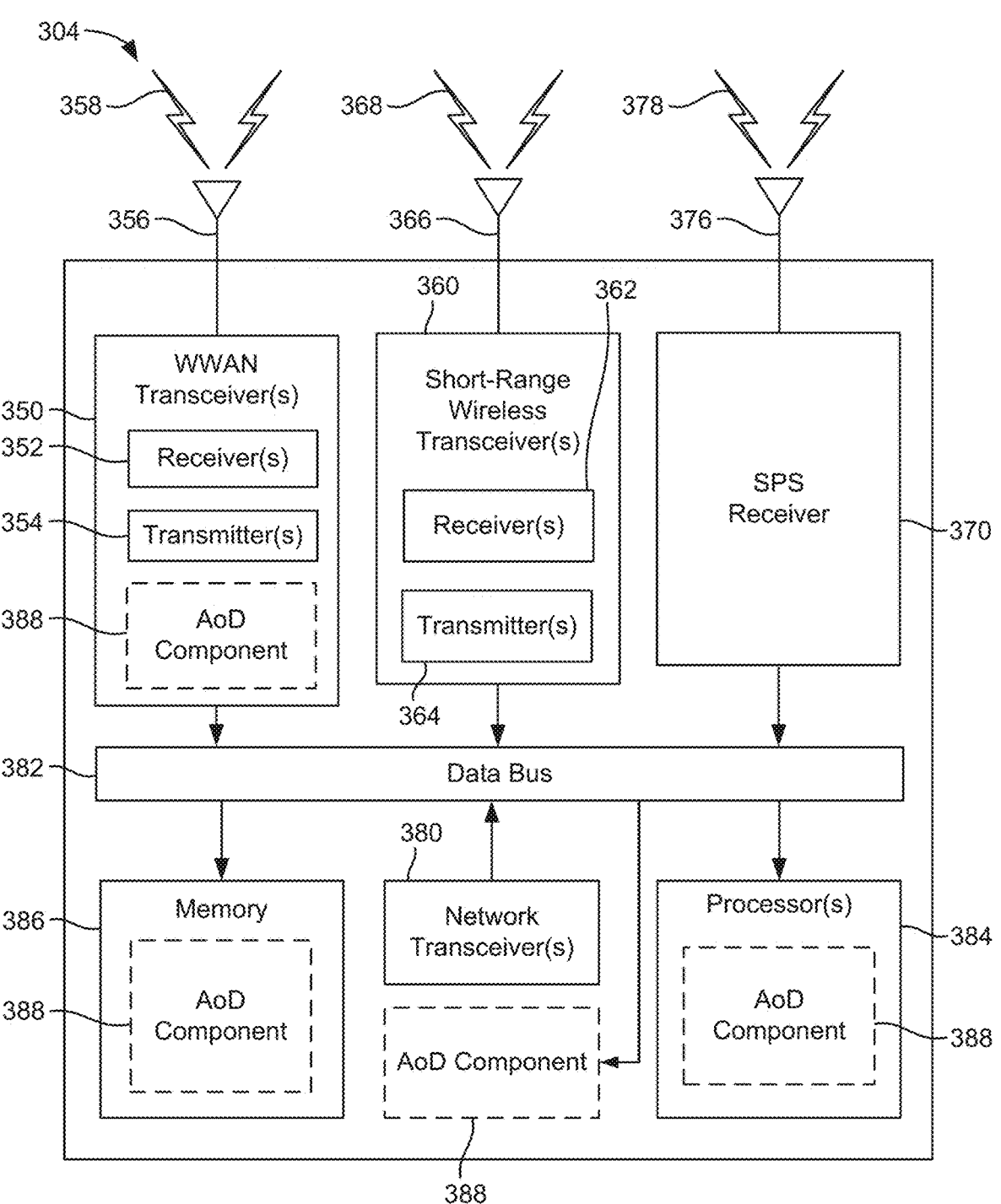
Figure 3C:
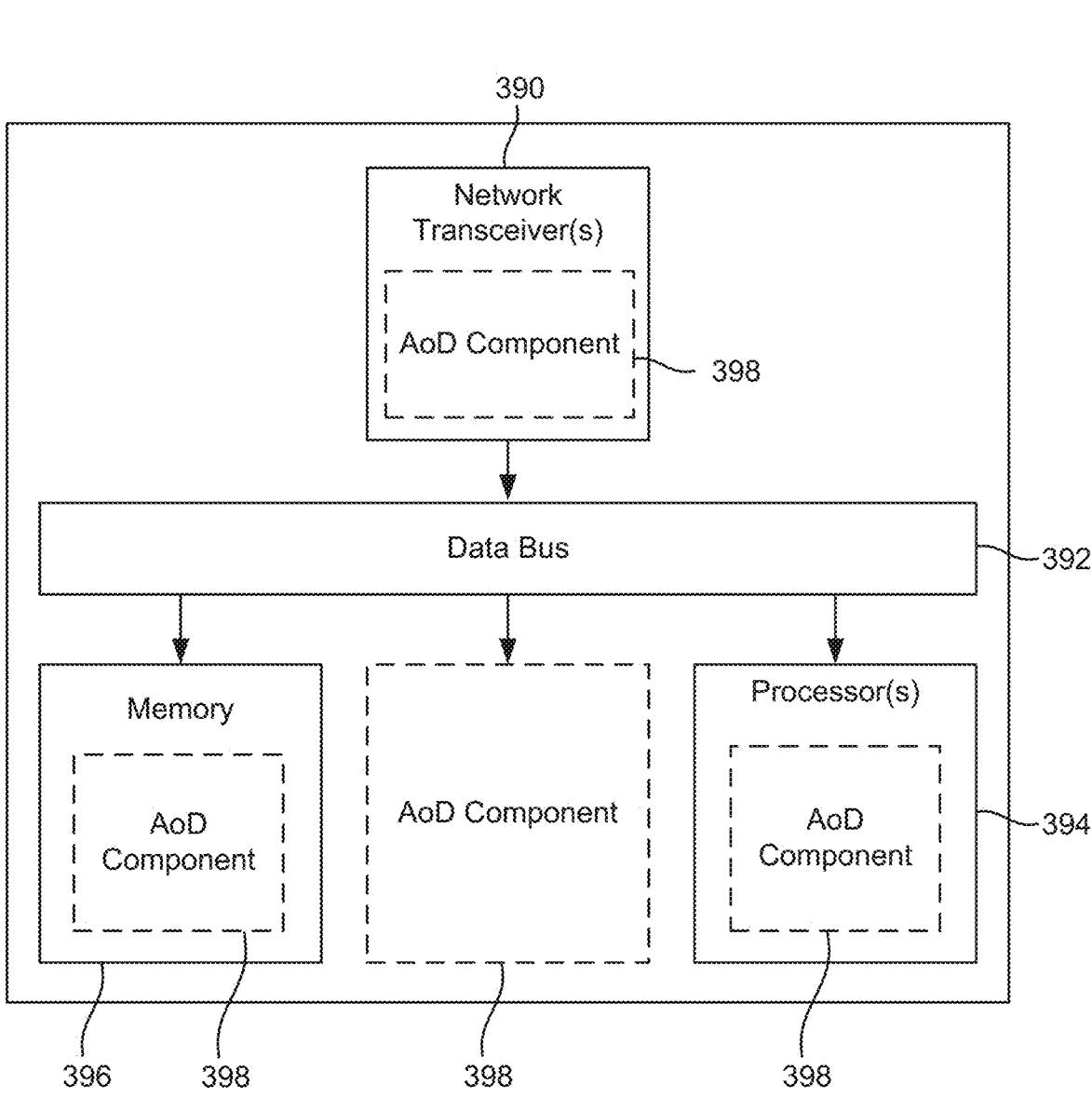

FIGS. 3A, 3B, and 3C illustrate several example components (represented by corresponding blocks) that may be incorporated into a device 302 (which may correspond to any of the UEs described herein and may therefore also be referred to as UE 302), a device 304 (which may correspond to any of the base stations or RISs described herein and therefore may also be referred to as BS 304 or RIS 304), and a device 306 (which may correspond to or embody any of the network functions described herein, including the location server 230 and the LMF 270, and may therefore also be referred to as network entity 306, LS 306, or LMF 306, or alternatively may be independent from the NG-RAN 220 and/or 5GC 210/260 infrastructure depicted in FIGS. 2A and 2B, such as a private network) to support the file transmission operations as taught herein. The device illustrated in FIG. 3B, or a simplified version of it, may also be a reconfigurable intelligent surface (RIS). It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR. LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include AoD component 342, 388, and 398, respectively. The AoD component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the AoD component 342,

388, and 398 may be external to the processors 332, 384, and 394 (e.g., part of a modem processing system, integrated with another processing system, etc.). Alternatively, the AoD component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the AoD component 342, which may be, for example, part of the one or more WWAN transceivers 310, the memory 340, the one or more processors 332, or any combination thereof, or may be a standalone component. FIG. 3B illustrates possible locations of the AoD component 388, which may be, for example, part of the one or more WWAN transceivers 350, the memory 386, the one or more processors 384, or any combination thereof, or may be a standalone component. FIG. 3C illustrates possible locations of the AoD component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the SPS receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the SPS receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station." "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the AoD component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Various frame structures may be used to support downlink and uplink transmissions between network nodes (e.g., base stations and UEs). FIGS. 4A to 4D are diagrams illustrating example frame structures and channels within the frame structures, according to aspects of the disclosure. Other wireless communications technologies may have different frame structures and/or different channels.

Figure 4A:
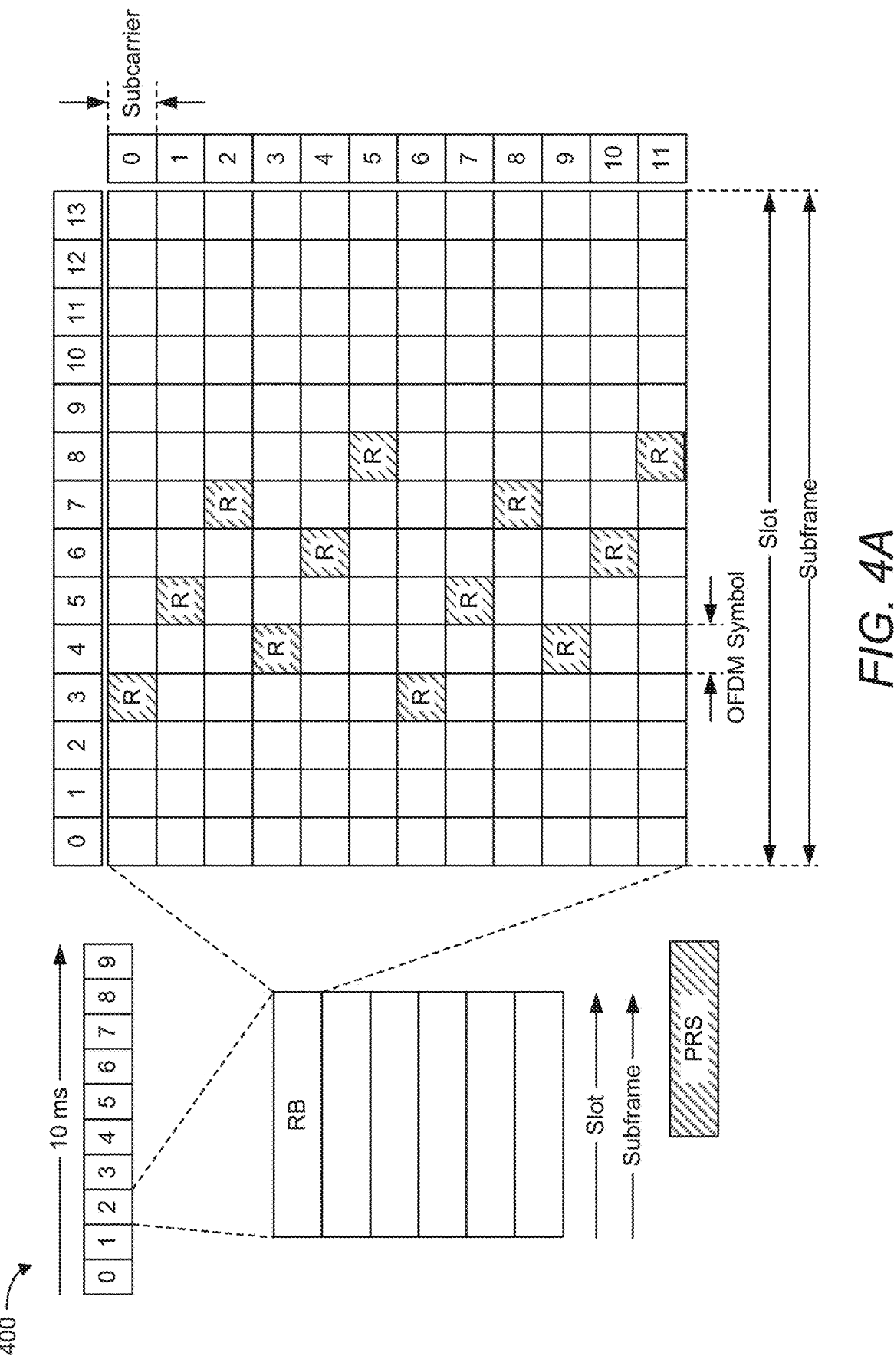
FIGS. 4A to 4D are diagrams illustrating example frame structures and channels within the frame structures, according to aspects of the disclosure.

FIG. 4A is a diagram 400 illustrating an example of a downlink frame structure, according to aspects of the disclosure. LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu=0$), 30 kHz ($\mu=1$), 60 kHz ($\mu=2$), 120 kHz ($\mu=3$), and 240 kHz ($\mu=4$) or greater may be available. In each subcarrier spacing, there are 14 symbols per slot. For 15 kHz SCS ($\mu=0$), there is one slot per subframe, 10 slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu=1$), there are two slots per subframe, 20 slots per frame, the slot duration is 0.5 ms, the symbol duration is 33.3 $\mu$s, and the maximum nominal system bandwidth (in MHz) with a 4K FFT size is 100. For 60 kHz SCS ($\mu=2$), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu=3$), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu=4$), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIGS. 4A to 4D, a numerology of 15 kHz is used. Thus, in the time domain, a 10 ms frame is divided into 10 equally sized subframes of 1 ms each, and each subframe includes one time slot. In FIGS. 4A to 4D, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A to 4D, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs carry downlink reference (pilot) signals (DL-RS). The DL-RS may include positioning reference signals (PRS), tracking reference signals (TRS), phase tracking reference signals (PTRS), cell-specific reference signals (CRS), channel state information reference signals (CSI- RS), demodulation reference signals (DMRS), primary synchronization signals (PSS), secondary synchronization signals (SSS), synchronization signal blocks (SSBs), etc. FIG. 4A illustrates example locations of REs carrying PRS (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4A illustrates an example PRS resource configuration for comb-6 (which spans six symbols). That is, the locations of the shaded REs (labeled "R") indicate a comb-6 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols, 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3}; 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^{\mu}*\{4, 5, 8, 10, 16, 20, 32, 40, 64, 80, 160, 320, 640, 1280, 2560, 5120, 10240\}$ slots, with $\mu$=0, 1, 2, 3. The repetition factor may have a length selected from {1, 2, 4, 6, 8, 16, 32} slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the PDSCH are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

Figure 4B:
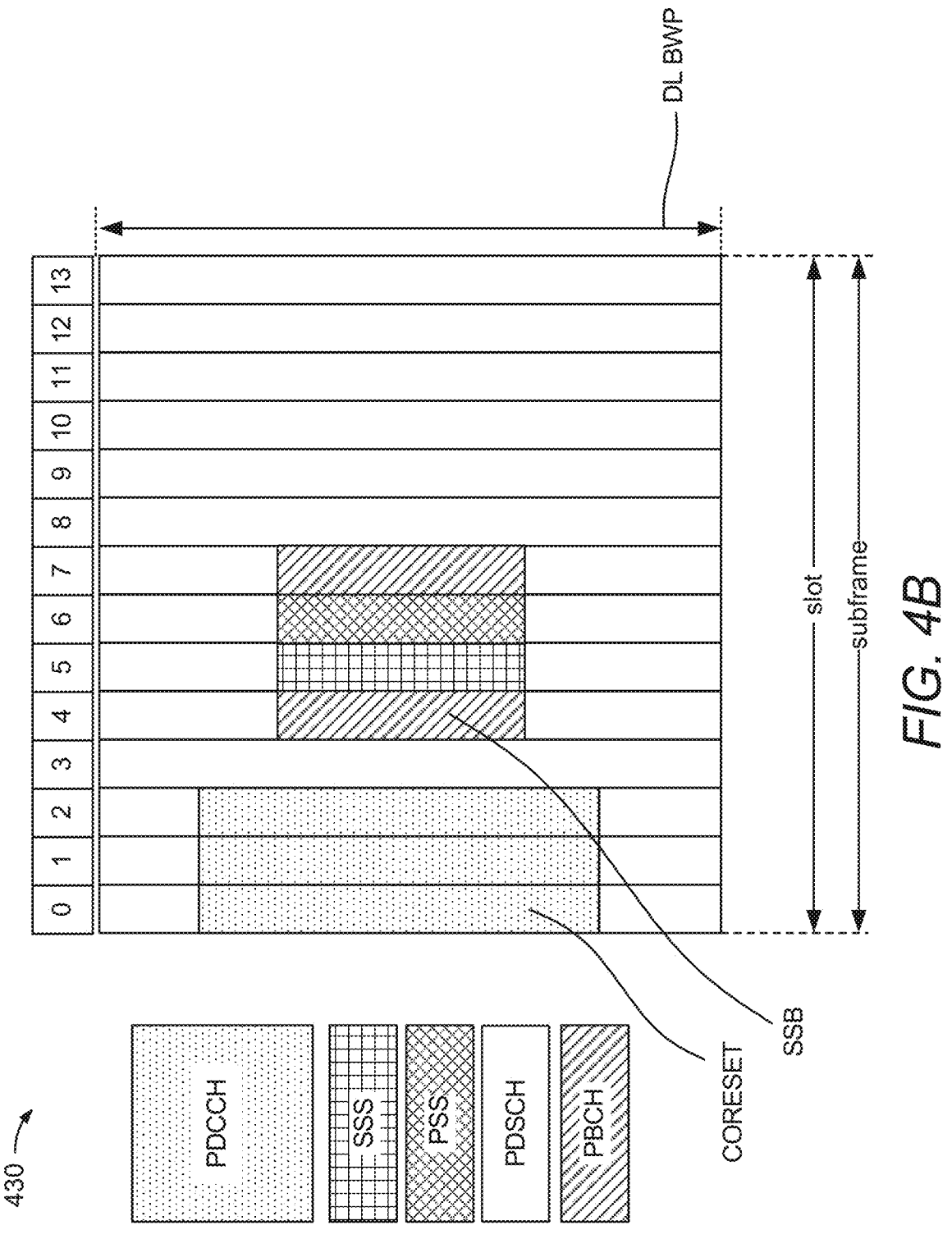

FIG. 4B is a diagram 430 illustrating an example of channels within the downlink frame structure, according to aspects of the disclosure. In NR, the channel bandwidth, or system bandwidth, is divided into multiple BWPs. A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols (although it may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., PUSCH). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

Figure 4C:
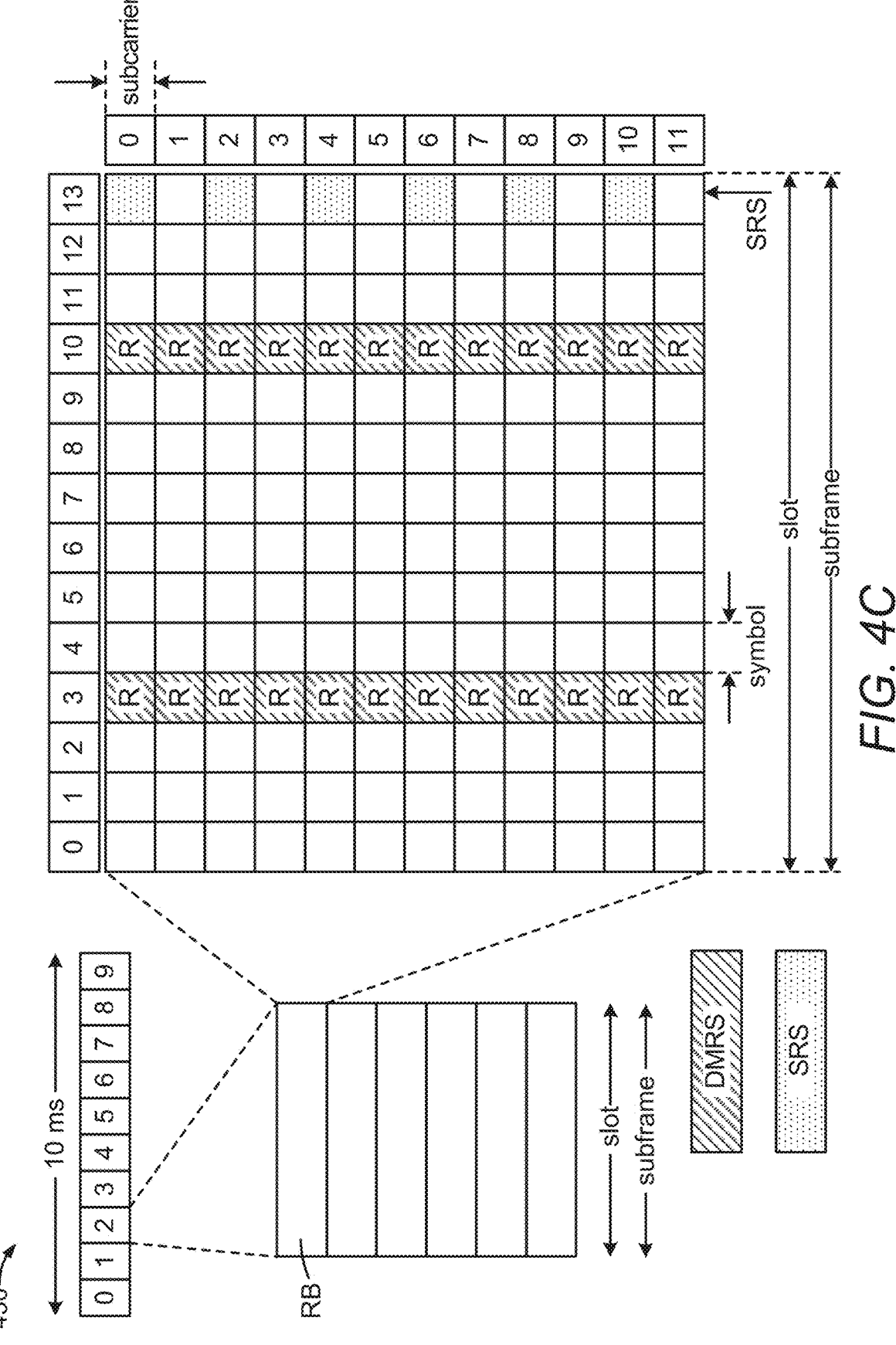

FIG. 4C is a diagram 450 illustrating an example of an uplink frame structure, according to aspects of the disclosure. As illustrated in FIG. 4C, some of the REs (labeled "R") carry DMRS for channel estimation at the receiver (e.g., a base station, another UE, etc.). A UE may additionally transmit SRS in, for example, the last symbol of a slot. The SRS may have a comb structure, and a UE may transmit SRS on one of the combs. In the example of FIG. 4C, the illustrated SRS is comb-2 over one symbol. The SRS may be used by a base station to obtain the channel state information (CSI) for each UE. CSI describes how an RF signal propagates from the UE to the base station and represents the combined effect of scattering, fading, and power decay with distance. The system uses the SRS for resource scheduling, link adaptation, massive MIMO, beam management, etc.

Currently, an SRS resource may span 1, 2, 4, 8, or 12 consecutive symbols within a slot with a comb size of comb-2, comb-4, or comb-8. The following are the frequency offsets from symbol to symbol for the SRS comb patterns that are currently supported. I-symbol comb-2: {0}; 2-symbol comb-2: {0, 1}; 4-symbol comb-2: {0, 1, 0, 1};

4-symbol comb-4: {0, 2, 1, 3}; 8-symbol comb-4: {0, 2, 1, 3, 0, 2, 1, 3}; 12-symbol comb-4: {0, 2, 1, 3, 0, 2, 1, 3, 0, 2, 1, 3}; 4-symbol comb-8: {0, 4, 2, 6}: 8-symbol comb-8: {0, 4, 2, 6, 1, 5, 3, 7}: and 12-symbol comb-8: {0, 4, 2, 6, 1, 5, 3, 7, 0, 4, 2, 6}.

A collection of resource elements that are used for transmission of SRS is referred to as an "SRS resource." and may be identified by the parameter "SRS-ResourceId." The collection of resource elements can span multiple PRBs in the frequency domain and N (e.g., one or more) consecutive symbol(s) within a slot in the time domain. In a given OFDM symbol, an SRS resource occupies consecutive PRBs. An "SRS resource set" is a set of SRS resources used for the transmission of SRS signals, and is identified by an SRS resource set ID ("SRS-ResourceSetId").

Generally, a UE transmits SRS to enable the receiving base station (either the serving base station or a neighboring base station) to measure the channel quality between the UE and the base station. However, SRS can also be specifically configured as uplink positioning reference signals for uplink-based positioning procedures, such as uplink time difference of arrival (UL-TDOA), round-trip-time (RTT), uplink angle-of-arrival (UL-AoA), etc. As used herein, the term "SRS" may refer to SRS configured for channel quality measurements or SRS configured for positioning purposes. The former may be referred to herein as "SRS-for-communication" and/or the latter may be referred to as "SRS-for-positioning" when needed to distinguish the two types of SRS.

Several enhancements over the previous definition of SRS have been proposed for SRS-for-positioning (also referred to as "UL-PRS"), such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters "SpatialRelationInfo" and "PathLossReference" are to be configured based on a downlink reference signal or SSB from a neighboring TRP. Further still, one SRS resource may be transmitted outside the active BWP, and one SRS resource may span across multiple component carriers. Also, SRS may be configured in RRC connected state and only transmitted within an active BWP. Further, there may be no frequency hopping, no repetition factor, a single antenna port, and new lengths for SRS (e.g., 8 and 12 symbols). There also may be open-loop power control and not closed-loop power control, and comb-8 (i.e., an SRS transmitted every eighth subcarrier in the same symbol) may be used. Lastly, the UE may transmit through the same transmit beam from multiple SRS resources for UL-AoA. All of these are features that are additional to the current SRS framework, which is configured through RRC higher layer signaling (and potentially triggered or activated through MAC control element (CE) or DCI).

Figure 4D:
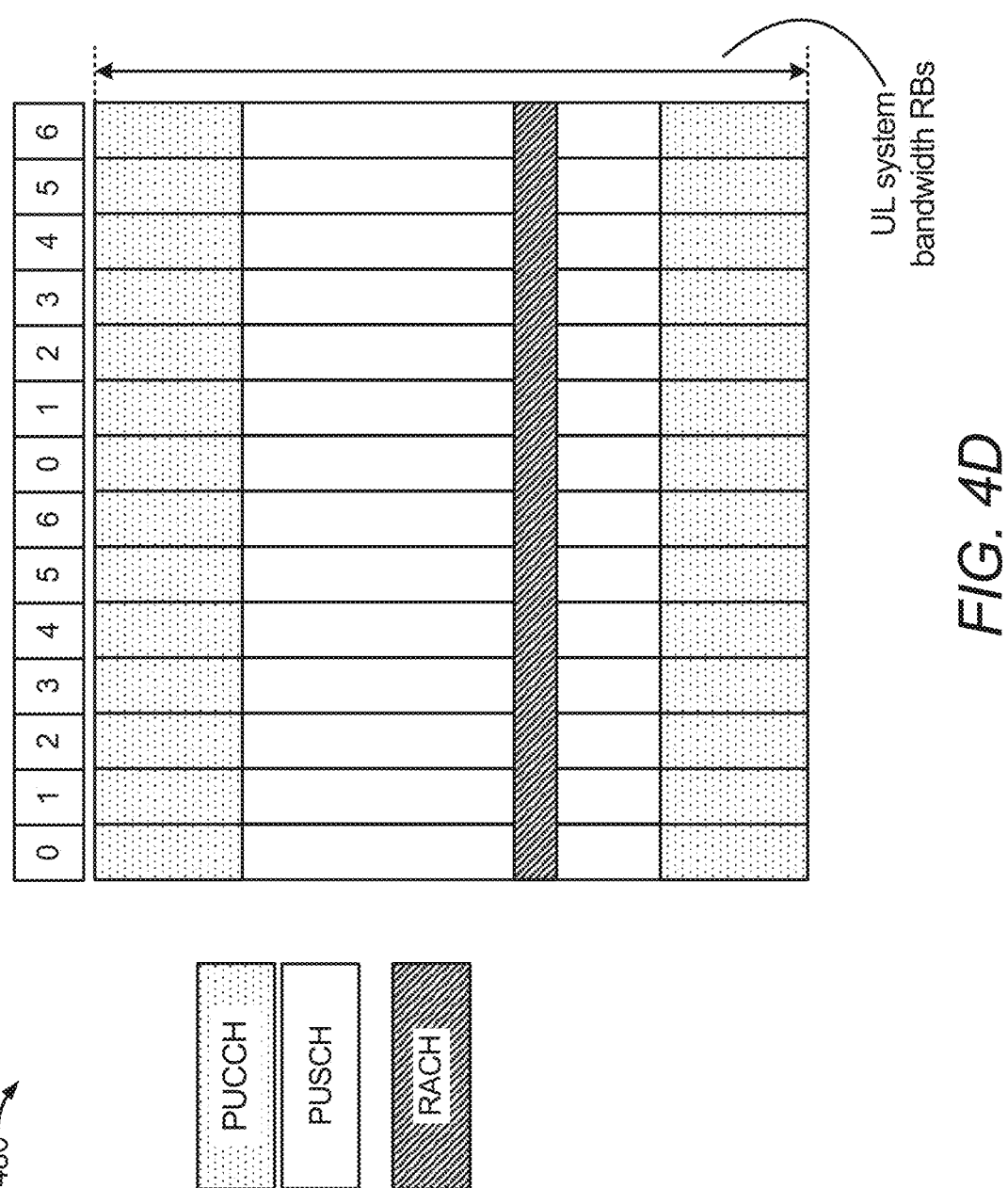

FIG. 4D is a diagram 480 illustrating an example of channels within an uplink frame structure, according to aspects of the disclosure. A random-access channel (RACH), also referred to as a physical random-access channel (PRACH), may be within one or more slots within a frame based on the PRACH configuration. The PRACH may include six consecutive RB pairs within a slot. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR. TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

Figure 5:
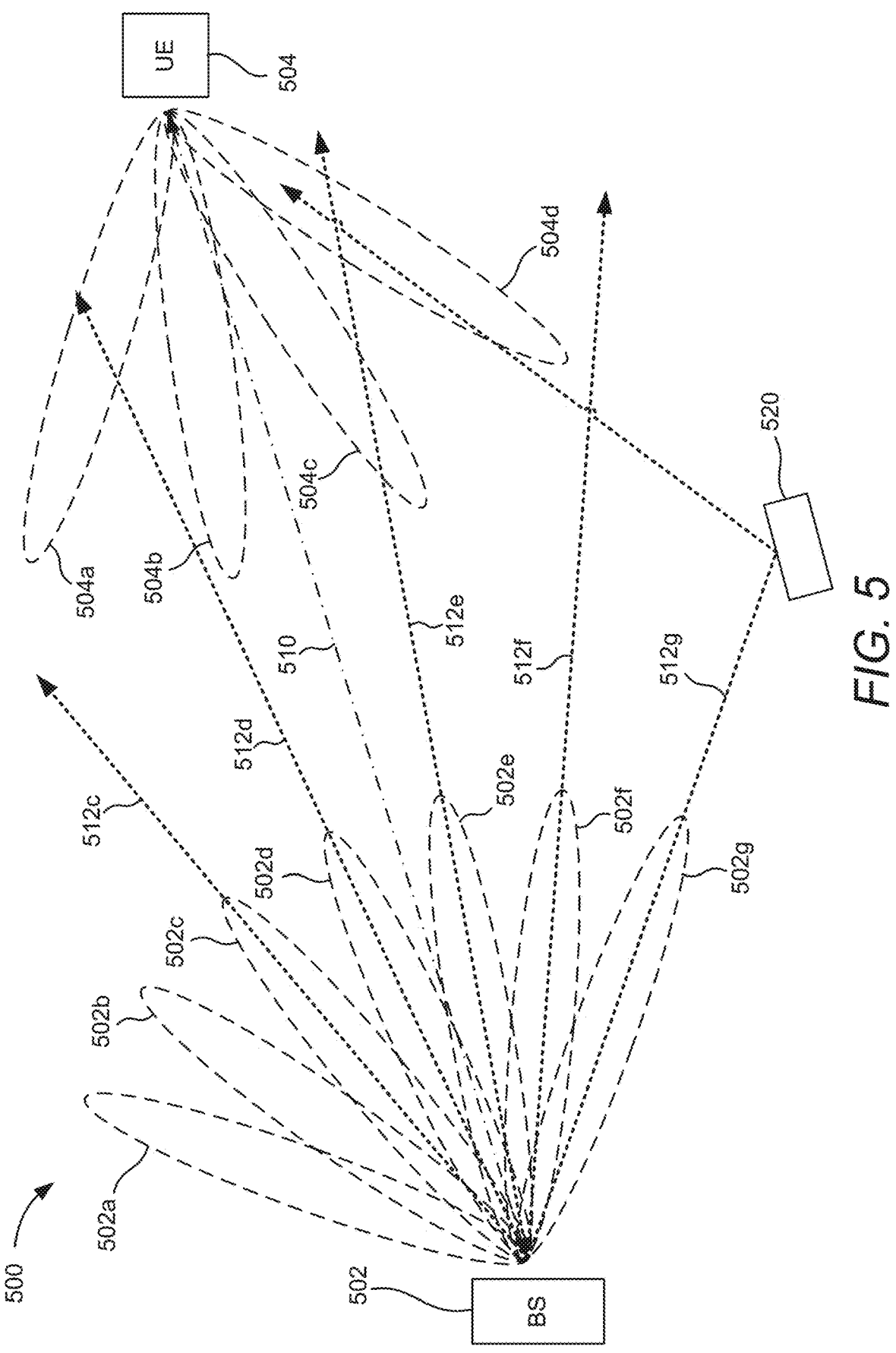
FIG. 5 is a diagram illustrating an example base station in communication with an example UE, according to aspects of the disclosure.

FIG. 5 is a diagram 500 illustrating a base station (BS) 502 (which may correspond to any of the base stations described herein) in communication with a UE 504 (which may correspond to any of the UEs described herein). Referring to FIG. 5, the base station 502 may transmit a beamformed signal to the UE 504 on one or more transmit beams 502a, 502b, 502c, 502d, 502e, 502f, 502g, each having a beam identifier that can be used by the UE 504 to identify the respective beam. Where the base station 502 is beamforming towards the UE 504 with a single array of antennas (e.g., a single TRP/cell), the base station 502 may perform a "beam sweep" by transmitting first beam 502a, then beam 502b, and so on until lastly transmitting beam 502g. Alternatively, the base station 502 may transmit beams 502a-502g in some pattern, such as beam 502a, then beam 502g, then beam 502b, then beam 502f, and so on. Where the base station 502 is beamforming towards the UE 504 using multiple arrays of antennas (e.g., multiple TRPs/cells), each antenna array may perform a beam sweep of a subset of the beams 502a-502g. Alternatively, each of beams 502a-502g may correspond to a single antenna or antenna array.

FIG. 5 further illustrates the paths 512c, 512d, 512e, 512f, and 512g followed by the beamformed signal transmitted on beams 502c, 502d, 502e, 502f, and 502g, respectively. Each path 512c, 512d, 512e, 512f, 512g may correspond to a single "multipath" or, due to the propagation characteristics of radio frequency (RF) signals through the environment, may be comprised of a plurality (a cluster) of "multipaths." Note that although only the paths for beams 502c-502g are shown, this is for simplicity, and the signal transmitted on each of beams 502a-502g will follow some path. In the example shown, the paths 512c, 512d, 512e, and 512f are straight lines, while path 512g reflects off an obstacle 520 (e.g., a building, vehicle, terrain feature, etc.).

The UE 504 may receive the beamformed signal from the base station 502 on one or more receive beams 504a, 504b, 504c, 504d. Note that for simplicity, the beams illustrated in FIG. 5 represent either transmit beams or receive beams, depending on which of the base station 502 and the UE 504 is transmitting, and which is receiving. Thus, the UE 504 may also transmit a beamformed signal to the base station 502 on one or more of the beams 504a-504d, and the base station 502 may receive the beamformed signal from the UE 504 on one or more of the beams 502a-502g.

In an aspect, the base station 502 and the UE 504 may perform beam training to align the transmit and receive beams of the base station 502 and the UE 504. For example, depending on environmental conditions and other factors, the base station 502 and the UE 504 may determine that the best transmit and receive beams are 502d and 504b, respectively, or beams 502e and 504c, respectively. The direction of the best transmit beam for the base station 502 may or may not be the same as the direction of the best receive beam, and likewise, the direction of the best receive beam for the UE 504 may or may not be the same as the direction of the best transmit beam. Note, however, that aligning the transmit and receive beams is not necessary to perform a downlink angle-of-departure (DL-AoD) or uplink angle-of-arrival (UL-AoA) positioning procedure.

To perform a DL-AoD positioning procedure, the base station 502 may transmit reference signals (e.g., PRS, CRS, TRS, CSI-RS, PSS, SSS, etc.) to the UE 504 on one or more of beams 502a-502g, with each beam having a different transmit angle. The different transmit angles of the beams will result in different received signal strengths (e.g., RSRP, RSRQ, SINR, etc.) at the UE 504. Specifically, the received signal strength will be lower for transmit beams 502a-502g that are further from the line of sight (LOS) path 510 between the base station 502 and the UE 504 than for transmit beams 502a-502g that are closer to the LOS path 510.

In the example of FIG. 5, if the base station 502 transmits reference signals to the UE 504 on beams 502c, 502d, 502e, 502f, and 502g, then transmit beam 502c is best aligned with the LOS path 510, while transmit beams 502c, 502d, 502f, and 502g are not. As such, beam 502e is likely to have a higher received signal strength at the UE 504 than beams 502c, 502d, 502f, and 502g. Note that the reference signals transmitted on some beams (e.g., beams 502c and/or 502f) may not reach the UE 504, or energy reaching the UE 504 from these beams may be so low that the energy may not be detectable or at least can be ignored.

The UE 504 can report the received signal strength, and optionally, the associated measurement quality, of each measured transmit beam 502c-502g to the base station 502, or alternatively, the identity of the transmit beam having the highest received signal strength (beam 502e in the example of FIG. 5). Alternatively or additionally, if the UE 504 is also engaged in a round-trip-time (RTT) or time-difference of arrival (TDOA) positioning session with at least one base station 502 or a plurality of base stations 502, respectively, the UE 504 can report reception-to-transmission time difference (Rx–Tx) or reference signal time difference (RSTD) measurements (and optionally the associated measurement qualities), respectively, to the serving base station 502 or other positioning entity. In any case, the positioning entity (e.g., the base station 502, a location server, a third-party client. UE 504, etc.) can estimate the angle from the base station 502 to the UE 504 as the AoD of the transmit beam having the highest received signal strength at the UE 504, here, transmit beam 502e.

In one aspect of DL-AoD-based positioning, where there is only one involved base station 502, the base station 502 and the UE 504 can perform a round-trip-time (RTT) procedure to determine the distance between the base station 502 and the UE 504. Thus, the positioning entity can determine both the direction to the UE 504 (using DL-AoD positioning) and the distance to the UE 504 (using RTT positioning) to estimate the location of the UE 504. Note that the AoD of the transmit beam having the highest received signal strength does not necessarily lie along the LOS path 510, as shown in FIG. 5. However, for DL-AoD-based positioning purposes, it is assumed to do so.

In another aspect of DL-AoD-based positioning, where there are multiple involved base stations 502, each base station 502 can report, to the positioning entity, the determined AoD from the base station 502 to the UE 504. The positioning entity receives multiple such AoDs from a plurality of involved base stations 502 (or other geographically separated transmission points) for the UE 504. With this information, and knowledge of the base stations' 502 geographic locations, the positioning entity can estimate a location of the UE 504 as the intersection of the received AoDs. There should be at least two involved base stations 502 for a two-dimensional (2D) location solution, but as will be appreciated, the more base stations 502 that are involved in the positioning procedure, the more accurate the estimated location of the UE 504 will be. For UE assisted based positioning, the serving base station reports the RSRP measurements to the positioning entity (e.g., a location server). The AoD is not determined or reported by each base station.

To perform an UL-AoA positioning procedure, the UE 504 transmits uplink reference signals (e.g., UL-PRS, SRS, DMRS, etc.) to the base station 502 on one or more of uplink transmit beams 504a-504d. The base station 502 receives the uplink reference signals on one or more of uplink receive beams 502a-502g. The base station 502 determines the angle of the best receive beams 502a-502g used to receive the one or more reference signals from the UE 504 as the AoA from the UE 504 to the base station 502. Specifically, each of the receive beams 502a-502g will result in a different received signal strength (e.g., RSRP, RSRQ, SINR etc.) of the one or more reference signals at the base station 502. Further, the channel impulse response of the one or more reference signals will be smaller for receive beams 502a-502g that are further from the actual LOS path between the base station 502 and the UE 504 than for receive beams 502a-502g that are closer to the LOS path. Likewise, the received signal strength will be lower for receive beams 502a-502g that are further from the LOS path than for receive beams 502a-502g that are closer to the LOS path. As such, the base station 502 identifies the receive beam 502a-502g that results in the highest received signal strength and, optionally, the strongest channel impulse response, and estimates the angle from itself to the UE 504 as the AoA of that receive beam 502a-502g. Note that as with DL-AoD-based positioning, the AoA of the receive beam 502a-502g resulting in the highest received signal strength (and strongest channel impulse response if measured) does not necessarily lie along the LOS path 510. However, for UL-AoA-based positioning purposes, in FR2, it may be assumed to do so. For FR1, the AoA estimation could be conducted with a digital beam scan. For example, the UE 504 may estimate AoA as the AoA having the earliest path with a power larger than some threshold value.

Note that while the UE 504 is illustrated as being capable of beamforming, this is not necessary for DL-AoD and UL-AoA positioning procedures. Rather, the UE 504 may receive and transmit on an omni-directional antenna.

Where the UE 504 is estimating its location (i.e., the UE is the positioning entity), it needs to obtain the geographic location of the base station 502. The UE 504 may obtain the location from, for example, the base station 502 itself or a location server (e.g., location server 230, LMF 270, SLP 272). With the knowledge of the distance to the base station 502 (based on the RTT or timing advance), the angle between the base station 502 and the UE 504 (based on the UL-AoA of the best receive beam 502a-502g), and the known geographic location of the base station 502, the UE 504 can estimate its location.

Alternatively, where a positioning entity, such as the base station 502 or a location server, is estimating the location of the UE 504, the base station 502 reports the AoA of the receive beam 502a-502g resulting in the highest received signal strength (and optionally strongest channel impulse response) of the reference signals received from the UE 504, or all received signal strengths and channel impulse responses for all receive beams 502a-502g (which allows the positioning entity to determine the best receive beam 502a-502g). The base station 502 may additionally report the Rx-Tx time difference to the UE 504. The positioning entity can then estimate the location of the UE 504 based on the UE's 504 distance to the base station 502, the AoA of the identified receive beam 502a-502g, and the known geographic location of the base station 502.

Figure 6:
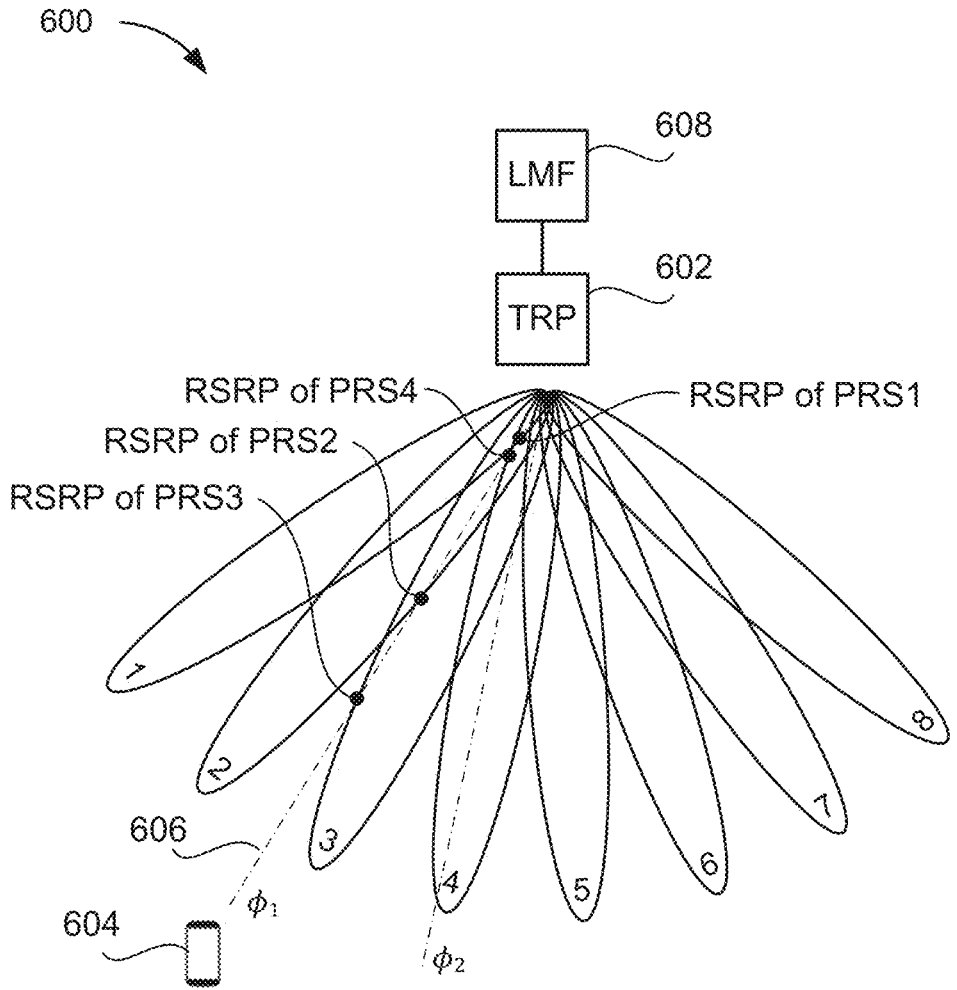
FIG. 6 illustrates a conventional method of performing DL-AoD measurements using RSRP measurements.

FIG. 6 illustrates a conventional method 600 of performing DL-AoD measurements using RSRP measurements. In FIG. 6, a TRP 602 transmits a set of PRS signals each at different angles of azimuth. Each beam's radiation pattern is represented graphically by a numbered oval, with the oval numbered 1 representing PRS1, the oval numbered 2 representing PRS2, and so on. A UE 604, having a line of sight (LOS) path 606 to the TRP 602, takes RSRP measurements for each of the PRS signals and reports those measurements to the TRP 602, which may forward those measurements to a positioning entity, such as a location management function (LMF) 608. The perceived RSRP of each PRS from the point of view of the UE 604 will depend upon the relative angle of the PRS beam to the angle of the LOS path 606, labeled $\phi1$ in FIG. 6. This is represented graphically in FIG. 6 as the intersection of the LOS path 606 and the radiation pattern with the beam, where the distance of the intersection from the TRP corresponds to perceived power of the beam. In the example illustrated in FIG. 6, the angle of the LOS path 606 is closest to the transmission angle of PRS3, and so the RSRP of PRS3 measured by the UE 604 is relatively large compared to the RSRP of PRS2, which is larger than the RSRP of PRS4, which is larger than the RSRP of PRS1. The UE 604 reports these RSRP measurements to the TRP 602.

It can be seen in FIG. 6 that the set of RSRP measurements, i.e., the measured RSRPs of the PRS beams transmitted by the TRP 602 and measured by a UE, will be different depending upon the azimuth angle $\phi$ of the UE. For a UE at azimuth angle $\phi2$ in FIG. 6, for example, the RSRP value of PRS4 will be highest, followed by the RSRP values for PRS3, PRS5, the PRS2. The expected RSRP values for each PRS as a function of azimuth angle can be modeled as a set of expected power curves, as shown in FIG. 7.

Figure 7:
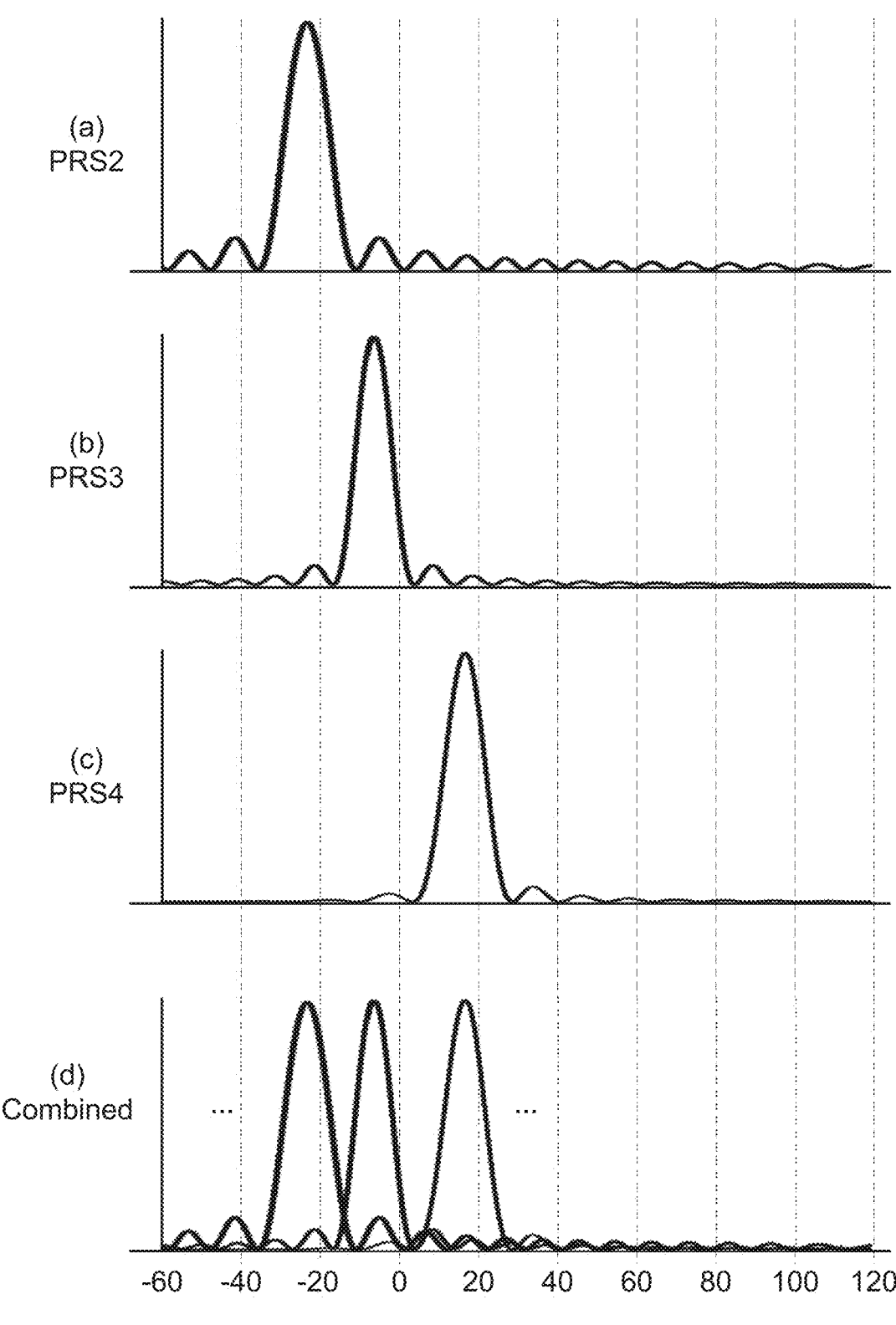
FIG. 7 is a plot of expected RSRP values as a function of azimuth angle, normalized to remove effects of distance.

FIG. 7 is a plot of expected RSRP values as a function of azimuth angle, normalized to remove effects of distance. In the example plot shown in FIG. 7, plots (a), (b), and (c) show the expected RSRP values of PRS2, PRS3, and PRS4, respectively, as a function of azimuth angle, and plot (d) is a combination of plots (a) through (c). Thus, at each angle of azimuth, there is a known ratio of values of PRS2, PRS3, and PRS4. The same concept applies to PRS beams not shown in FIG. 6. The TRP 602 transmits the PRS resources, which are measured by the UE 604. The UE 604 then reports up to 8 RSRP, one for each PRS resource, to the TRP 602.

In conventional UE-assisted positioning, the TRP 602 reports the measured RSRP values to the LMF 608, e.g., via the LPP protocol. The LMF 608 estimates the AoD, i.e., the LMF 608 can determine the azimuth angle of the UE 604 by comparing the RSRP measurements to the expected RSRP values for each PRS, and use the AoD to calculate a position of the UE 604. In conventional UE-based positioning, the UE 604 uses assistance data, including the geographic locations of TRP 602 and other TRPs, and the PRS beam information (e.g., beam azimuth and elevation), to estimate an AoD and calculate its own position. In either case, the expected RSRP values need to be modeled. In one aspect, this is performed by the following method. For each potential $\phi k \in [\phi 1, \ldots, \phi M]$ where a UE may be located, for each Beam $l \in [1, \ldots, Nbeams]$ that is being transmitted, calculate the expected Rx-power P(i, k). Then, derive the normalized vector P(k,) for each $k \in [1, \ldots, M]$:

$$P_k = \begin{bmatrix} \dfrac{P_{i,1}}{\max_l(P_{i,l})} \\ \vdots \\ \dfrac{P_{i,N_{beams}}}{\max_l(P_{i,l})} \end{bmatrix}$$

This results in a set of normalized expected RSRP values for each PRS beam, i.e., a set of relative RSRP values of the PRS beams at a particular azimuth angle, and as many of these sets are there are azimuth angles being considered. For UE-assisted AoD positioning, the LMF 608 denotes as $\hat{P}$ the received vector of normalized RSRP, and finds the k that results into a $P_k$ close to $\hat{P}$. For UE-based AoD positioning, the UE 604 is provided with the set of relative RSRP values of the PRS beams at each of a set of azimuth angles being modeled.

Figure 8:
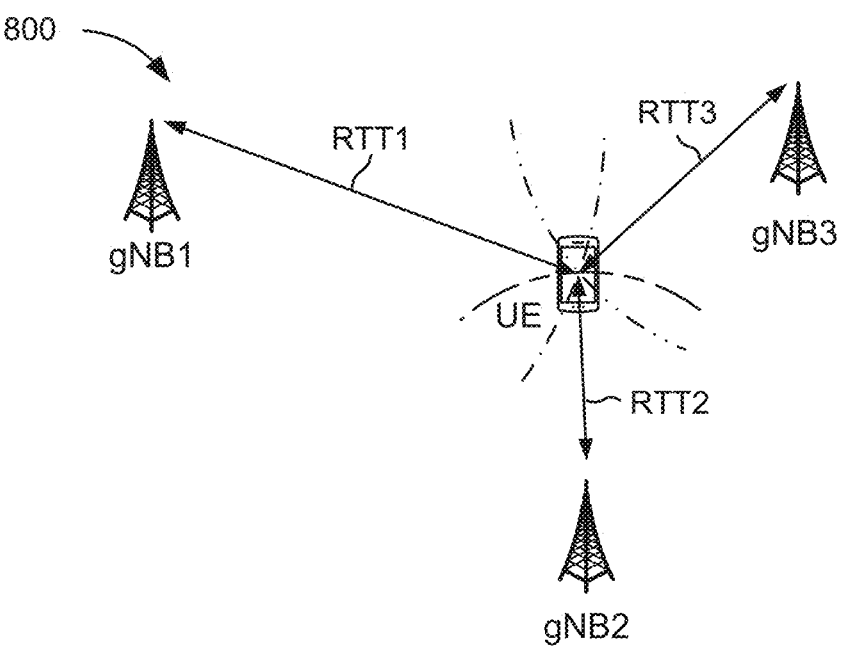
FIG. 8 illustrates a system for conventional multiple round-trip time (multi-RTT) positioning.

FIG. 8 illustrates a system 800 for conventional multiple round-trip time (multi-RTT) positioning. The position of the UE can be determined by trilateration or multilateration using the known locations of gNB1, gNB2, and gNB3 as well as the round-trip time (RT) from each gNB, e.g., RTT1, RTT2, and RTT3 in FIG. 8. While this method can achieve position accuracies of within 3 m for well-synchronized networks, it requires multiple gNBs.

Figure 9:
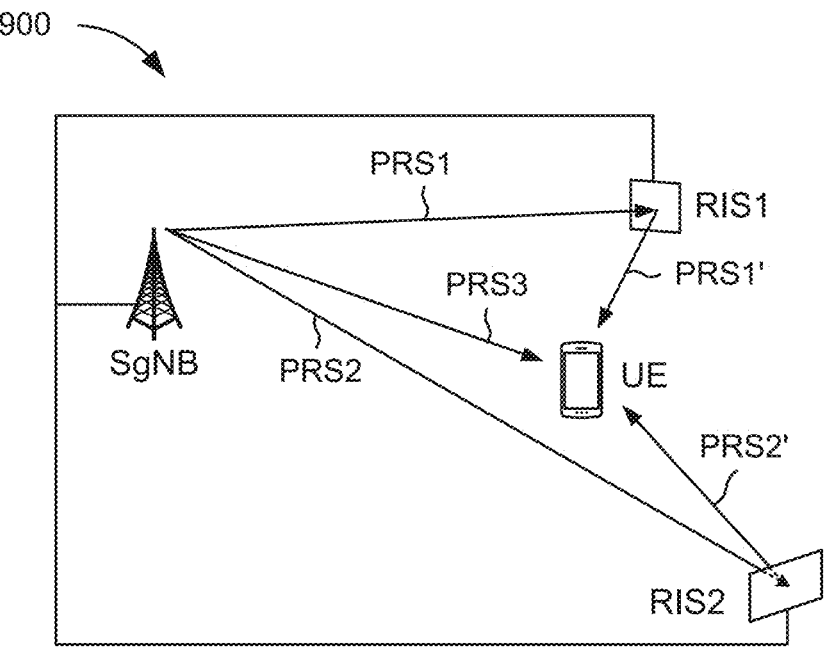
FIG. 9 illustrates a system for multi-RTT positioning using a single gNB.

FIG. 9 illustrates a system 900 for TDoA positioning using a single gNB. In FIG. 9, a serving gNB (SgNB) or other type of serving base station controls a pair of reconfigurable intelligent surfaces (RISs), e.g., RIS1 and RIS2, which will ultimately provide transmissions towards the UE. The SgNB sends a set of positioning reference signals, e.g., PRS1, PRS2, and PRS3, to a target UE, PRS1 is directed towards RIS1, which sends a reflected signal, PRS1', towards the UE. PRS2 is directed towards RIS2, which sends a reflected signal, PRS2', towards the UE, PRS3 is directed towards the UE directly. In the example illustrated in FIG. 9, PRS3 arrives at the UE first, at time ToA(SgNB). The PRS1 arrives at RIS1 at time Tprop(SgNB→RIS1), and PRS1' arrives at the UE at time ToA(RIS1), PRS2 arrives at RIS2 at time Tprop(SgNB→RIS2), and PRS2' arrives at the UE at time ToA(RIS2). The UE measures the times of arrival (ToA) of each of PRS1', PRS2', and PRS3.

In UE-assisted positioning, the UE simply reports RSTD for PRS1', PRS2', and PRS3. From that information, as well as the known locations of the SgNB, RIS1, and RIS2, a location server or other node can determine the distances of the UE to the SgNB, RIS1, and RIS2. In this manner, the location of the UE may be determined using multilateration methods in a single cell, which is useful for low-tier UEs. Since the UE does not need to transmit an SRS—positioning can be performed based on received DL-PRS only—this is a lower power solution compared to conventional RTT.

In UE-based positioning, the UE needs to know the transmission times of each of PRS1', PRS2', and PRS3. The assistance data provides the UE with the locations of the base station and of the RIS, and the UE knows the transmission times of PRS1, PRS2, and PRS3 from the PRS configuration. If the transmission time of PRS1' and PRS2' is not known directly, the UE can derive this information from knowing the transmission time of PRS1 and the hardware delay at RIS1 between receiving PRS1 and transmitting PRS1', which the UE can also get from assistance data from the base station. Likewise, the UE can derive the transmission time of PRS2' based on the transmission time of PRS2 and the hardware delay at RIS2 between receiving PRS2 and transmitting PRS2'.

FIG. 10 illustrates a system 1000 for multi-RTT positioning using UL-SRS signals and multiple RISs, e.g., RIS1. RIS2, and RIS3. The top portion of FIG. 10 shows the geographical positions of the entities involved in an example scenario and the bottom portion of FIG. 10 illustrates an example timing of a signal transmission and reflection in this example scenario. In the example shown in the bottom portion of FIG. 10, at time $T_1$, a UE sends an UL-SRS signal 1002 to a RIS, which receives the UL-SRS signal at time $T_2$. At time $T_3$, the RIS reflects the UL-SRS signal 1004 to the UE. The UE is guided (e.g., by network assistance data) to receive the reflected UL-SRS signal 1004 at time $T_4$. The RX beam with which the UE receives the reflected UL-SRS signal 1004 could be the same as the TX beam used by the UE to send the UL-SRS signal 1002.

In UE-assisted positioning, the UE can report the time delay $(T_4-T_1)$ to a location server or other network node. From that information, as well as the hardware delay $(T_3-T_2)$ at the RIS between receiving the UL-SRS signal 1002 and sending the reflected UL-SS signal 1004, the location server can determine the distance of the UE to the RIS.

In UE-based positioning, once the UE receives and validates the reflected UL-SRS signal 1004, the UE can calculate the RTT with respect to the RIS as $T_{RTT}=(T_4-T_1)-(T_3-T_2)\approx 2*Tprop_{(UE<->RIS)}$, where the UE determines the value of $(T_4-T_1)$ and receives the value of $(T_3-T_2)$, e.g., as assistance data provided by the base station that controls that RIS. The UE can then estimate its distance from the RIS based on the RTT to that RIS. After the UE has determined RTs for a sufficient number of reflected UL-SRS signals, it can derive its position based on trilateration or multilateration from the multiple RISs. The UE does not need to measure DL-PRS signals and could avoid transmitting SRS with high power towards the gNB—by transmitting with lower power towards a closer RIS—both of which reduce power consumption.

However, this technique still requires that the UE be able to send UL-SRS to, and receive reflections of those UL-SRS from, multiple RISs. This may be a problem for a low-tier (e.g., low-capacity) UE, such as the "NR light" UE, may not be capable of sending to or receiving from a distant RIS. This difficulty may be mitigated somewhat if the RIS is close to the UE, but then, the UE has to repeat the process for multiple RISs, which consumes more power. An additional disadvantage to this technique is that it requires at least two RISs, which may often not be the case.

To address these technical difficulties, techniques for UE-based positioning using a single RIS are presented. Rather than using a trilateration/multilateration approach, which requires measurement of distances from multiple reference points, methods and systems disclosed herein determine the location of a UE relative to a RIS by using a range and AoD approach.

FIG. 11 is a flowchart of an example process 1100 associated with RIS beam sweeping of SRS for AoD based positioning according to aspects of the disclosure. In some implementations, one or more process blocks of FIG. 11 may be performed by a UE (e.g., UE 103, UE 1404, etc.). In some implementations, one or more process blocks of FIG. 11 may be performed by another device or a group of devices separate from or including the user equipment (UE). Additionally, or alternatively, one or more process blocks of FIG. 11 may be performed by one or more components of UE 302, such as processor(s) 332, memory 340, WWAN transceiver(s) 310, short-range wireless transceiver(s) 320, SPS receiver 330, user interface 346, and/or AoD component 342, any or all of which may be considered means for performing this operation.

As shown in FIG. 11, process 1100 may include obtaining configuration information that identifies resources for sounding reference signal (SRS) positioning (block 1110). Means for performing the operation of block 1110 may include the WWAN transceiver(s) 310 of UE 302. For example, the UE 302 may receive the configuration information via receiver(s) 312. In some aspects, obtaining the configuration information comprises receiving the configuration information via radio resource control (RRC) signaling. In some aspects, obtaining the configuration information comprises receiving the configuration information from a network entity. In some aspects, receiving the configuration information from a network entity comprises receiving the configuration information from a location server. In some aspects, the configuration information indicates a number of SRS resources, a time to transmit an SRS transmission to a RIS, an expected time to receive a reflection of an SRS transmission from the RIS, an uncertainty of an expected time to receive a reflection of an SRS transmission from the RIS, or combinations thereof.

As further shown in FIG. 11, process 1100 may include transmitting, to a reconfigurable intelligent surface (RIS), a plurality of SRS transmissions at different times according to the configuration information (block 1120). Means for performing the operation of block 1120 may include the WWAN transceiver(s) 310 of UE 302. For example, the UE 302 may transmit the plurality of SRS transmissions at different times via the transmitter(s) 314.

As further shown in FIG. 11, process 1100 may include receiving, from the RIS, a plurality of SRS transmissions comprising reflections of the plurality of SRS transmissions to the RIS, wherein each of the plurality of SRS transmissions from the RIS is transmitted at a different angle of departure (AoD) from the RIS (block 1130). Means for performing the operation of block 1130 may include the WWAN transceiver(s) 310 of the UE 302. For example, the UE 302 may receive the plurality of SRS transmissions via the receiver(s) 312. In some aspects, each of the plurality of SRS transmissions from the RIS is received at a known time or received at a known delay after transmission of the corresponding SRS transmission to the RIS, according to the configuration information. In some aspects, each of the plurality of SRS transmissions from the RIS comprises information that associates it to the corresponding SRS transmission of the plurality of SRS transmissions to the RIS. For example, the SRS sent by the UE and the reflected SRS received from the RIS may have the same SRS ID, the same beam ID, the same known sequence, etc., or combinations of the above.

As further shown in FIG. 11, process 1100 may include measuring each of the plurality of SRS transmissions from the RIS to produce a plurality of measurements (block 1140). Means for performing the operation of block 1140 may include the WWAN transceiver(s) 310 of the UE 302. For example, the UE 302 may measure each of the plurality of SRS transmissions from the RIS using the receiver(s) 312. In some aspects, the UE 302 measures a set of RSRP values for each SRS transmission from the RIS.

As further shown in FIG. 11, process 1100 may include performing a positioning operation based on the plurality of measurements (block 1150). Means for performing the operation of block 1150 may include the processor(s) 332 and the WWAN transceiver(s) 310 of the UE 302. For example, in some aspects, performing a positioning operation based on the plurality of measurements comprises transmitting the plurality of measurements to a location server, e.g., via the transmitter(s) 314, and then receiving, from the location server, a location estimate based on the plurality of measurements, e.g., via the receiver(s) 312. In other aspects, performing a positioning operation based on the plurality of measurements comprises determining an AoD of the UE from the RIS based on the plurality of measurements. In some aspects, this involves receiving assistance data via the receiver(s) 312. The assistance data may comprise information such as a geographic location of the RIS, an orientation of the RIS, characteristics of reflected SRS beams, or combinations thereof, which are considered by the processor(s) 332 while determining the AoD of the UE from the RIS. In some aspects, characteristics of reflected SRS beams comprise an azimuth angle or beamwidth, an elevation angle or beamwidth, a boresight direction uncertainty, a beamwidth uncertainty, a transmission time uncertainty, or combinations thereof. In some aspects, process 1100 includes estimating a location of the UE based on the AoD and a distance from the UE to the RIS.

Process 1100 may include additional implementations, such as any single implementation or any combination of implementations described below and/or in connection with one or more other processes described elsewhere herein. Although FIG. 1I shows example blocks of process 1100, in some implementations, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a flowchart of an example process 1200 associated with RIS beam sweeping of SRS for AoD based positioning according to aspects of the disclosure. In some implementations, one or more process blocks of FIG. 12 may be performed by RIS (e.g., RIS 1406, etc.). In some implementations, one or more process blocks of FIG. 12 may be performed by another device or a group of devices separate from or including the reconfigurable intelligent surface (RIS). Additionally, or alternatively, one or more process blocks of FIG. 12 may be performed by one or more components of RIS 304, such as processor(s) 384, memory 386, WWAN transceiver(s) 350, short-range wireless transceiver(s) 360, SPS receiver 370, network transceiver(s) 380, and/or AoD component(s) 388, any or all of which may be considered means for performing this operation.

As shown in FIG. 12, process 1200 may include obtaining configuration information that identifies resources for sounding reference signal (SRS) positioning (block 1210). Means for performing the operation of block 1210 may include the WWAN transceiver(s) 350 and the network transceiver(s) 380 of device 304. For example, the RIS may receive the configuration information from a location server via the WWAN transceiver(s) 350 or the network transceiver(s) 380. In some aspects, obtaining the configuration information comprises receiving the configuration information via radio resource control (RRC) signaling, e.g., from a base station that controls the RIS. In some aspects, obtaining the configuration information comprises receiving the configuration information from a network entity, which may be a location server, LMF, or other network node. In some aspects, the configuration information indicates a number of SRS resources, an expected time to receive an SRS transmission from the UE, an uncertainty of an expected time to receive an SRS transmission from the UE, an expected time to send, to the UE, a reflection of an SRS transmission from the UE, an AoD at which to send the reflection of each respective SRS transmission from the UE, or combinations thereof.

As further shown in FIG. 12, process 1200 may include receiving, from a user equipment (UE), a plurality of SRS transmissions at different times (block 1220). Means for performing the operation of block 1220 may include the WWAN transceiver(s) 350 of device 304. For example, the RIS may receive the plurality of SRS transmissions via receiver(s) 352.

As further shown in FIG. 12, process 1200 may include transmitting a plurality of SRS transmissions comprising reflections of the plurality of SRS transmissions received from the UE, wherein each of the plurality of SRS transmissions from the RIS are transmitted at a different angle of departure (AoD) from the RIS according to the configuration information (block 1230). Means for performing the operation of block 1230 may include the WWAN transceiver(s) 350 of device 306. For example, the RIS may transmit the plurality of reflected SRS transmissions via the transmitter(s) 354. In some aspects, each of the plurality of SRS transmissions comprising reflections of the plurality of SRS transmissions received from the UE comprises information that associates it to the corresponding SRS transmission of the plurality of SRS transmissions received from the UE. In some aspects, the SRS received from the UE and the reflected SRS transmitted by the RIS may have the same SRS ID, the same beam ID, the same known sequence, etc., or combinations of the above.

Process 1200 may include additional implementations, such as any single implementation or any combination of implementations described below and/or in connection with one or more other processes described elsewhere herein. Although FIG. 12 shows example blocks of process 1200, in some implementations, process 1200 may include additional blocks, fewer blocks, different blocks, or differently arranged blocks than those depicted in FIG. 12. Additionally, or alternatively, two or more of the blocks of process 1200 may be performed in parallel.

FIG. 13A and FIG. 13B are flowcharts showing portions of an example process 1300 associated with RIS beam sweeping of SRS for AoD based positioning according to aspects of the disclosure. In some implementations, one or more process blocks of FIGS. 13A and 13B may be performed by a location server (e.g., location server 172. LMF 1402, etc.) or a base station (e.g., BS 102, BS 304, etc.). In some implementations, one or more process blocks of FIGS. 13A and 13B may be performed by another device or a group of devices separate from or including the location server (LS). Additionally, or alternatively, one or more process blocks of FIGS. 13A and 13B may be performed by one or more components of device 306, such as the processor(s) 394, memory 396, network transceiver(s) 390, and/or AoD component(s) 398, any or all of which may be considered means for performing this operation.

As shown in FIG. 13A, process 1300 may include sending, to a reconfigurable intelligent surface (RIS), first configuration information that identifies resources for sounding reference signal (SRS) positioning (block 1310). Means for performing the operation of block 1310 may include the network transceiver(s) 390 of device 306. As further shown in FIG. 13A, process 1300 may include sending, to a user equipment (UE), second configuration information that identifies resources for sounding reference signal (SRS) positioning (block 1320). Means for performing the operation of block 1320 may include the network transceiver(s) 390 of device 306. In some aspects, the first configuration information and the second configuration information may indicate a number of SRS resources, a time for the UE to transmit an SRS transmission to the RIS, an expected time for the UE to receive a reflection of an SRS transmission from the RIS, an uncertainty of an expected time for the UE to receive a reflection of an SRS transmission from the RIS, an angle of departure (AoD) at which the RIS should transmit the reflection of each respective SRS transmission from the UE, or combinations thereof.

As shown in FIG. 13B, process 1300 may optionally include sending, to the UE, assistance data that comprises a geographic location of the RIS, an orientation of the RIS, characteristics of reflected SS beams, or combinations thereof (block 1330). Characteristics of reflected SRS beams may include an azimuth angle, an azimuth beamwidth, an elevation angle, an elevation beamwidth, a boresight direction uncertainty, a beamwidth uncertainty, a transmission time uncertainty, or combinations thereof.

As further shown in FIG. 13B, process 1300 may optionally include receiving, from the UE, a plurality of reference signal received power (RSRP) values corresponding to a plurality of reflected SRS transmissions measured by the UE (block 1340), determining an AoD of the UE from the RIS based on the plurality of RSRP values (block 1350), estimating a location of the UE based at least in part on the AoD (block 1360), and sending the location estimate to the UE (block 1370). Means for performing the operations of blocks 1340, 1350, 1360, and 1370 may include the network transceiver(s) 390, memory 396, processor(s) 394, and/or AoD component(s) 398 of device 306.

Process 1300 may include additional implementations, such as any single implementation or any combination of implementations described below and/or in connection with one or more other processes described elsewhere herein. Although FIGS. 13A and 13B show example blocks of process 1300, in some implementations, process 1300 may include additional blocks, fewer blocks, different blocks, or differently arranged blocks than those depicted in FIGS. 13A and 13B. Additionally, or alternatively, two or more of the blocks of process 1300 may be performed in parallel.

FIG. 14 illustrates an example network 1400 implementing a UE-based positioning with a single RIS according to some aspects of the disclosure. In FIG. 14, the network 1400 includes an LMF 1402, a UE 1404, and a RIS 1406, with intervening nodes in the signaling path between the LMF 1402 and the UE 1404 omitted for clarity. The top portion of FIG. 14 shows example beam patterns for SRS1', SRS2', and so on, each with a different transmission angle A, B, C, etc., as transmitted by the RIS 1406, e.g., according to the SRS configuration(s) received by the RIS 1406. The actual AoD of the UE 1404 is shown as dashed line 1408 in FIG. 14, and the dots located at the intersections of that vector with the beam patterns C-F represent the relative RSRP values that the UE 1404 will measure for each of those beams, where the closer the dot is to the UE 1404, the higher the relative measured RSRP. In the example shown in FIG. 12, the relative RSRP values, from highest to lowest, are: SRS5', SRS4', SRS6', and SRS3'. From this particular pattern, the AoD 1202 of the UE 1404 can be derived, e.g., using the methods similar to those described for FIG. 6 and FIG. 7. The bottom portion of FIG. 12 illustrates an example timing assignment of SRS resources to slots, e.g., SRS3 and SRS3' will occur during slot n+2, SRS4 and SRS4' will occur during slot n+3, and so on. In this example, the SRS resources are time domain multiplexed, in recognition that a RIS may not have advanced baseband processing capability. Moreover, a RIS may not be able to comb staggered SRS signals into multiple different beams, in which case the RIS may simply reflect any frequency domain multiplexed SRS resources into the same TX beam for reflection. In FIG. 12, the SRS resources occupy separate slots, but in some aspects, the SRS resources may occupy separate symbols in the same slot, separate symbols in different slots, and other configurations. These examples are illustrative and not limiting.

Figure 15:
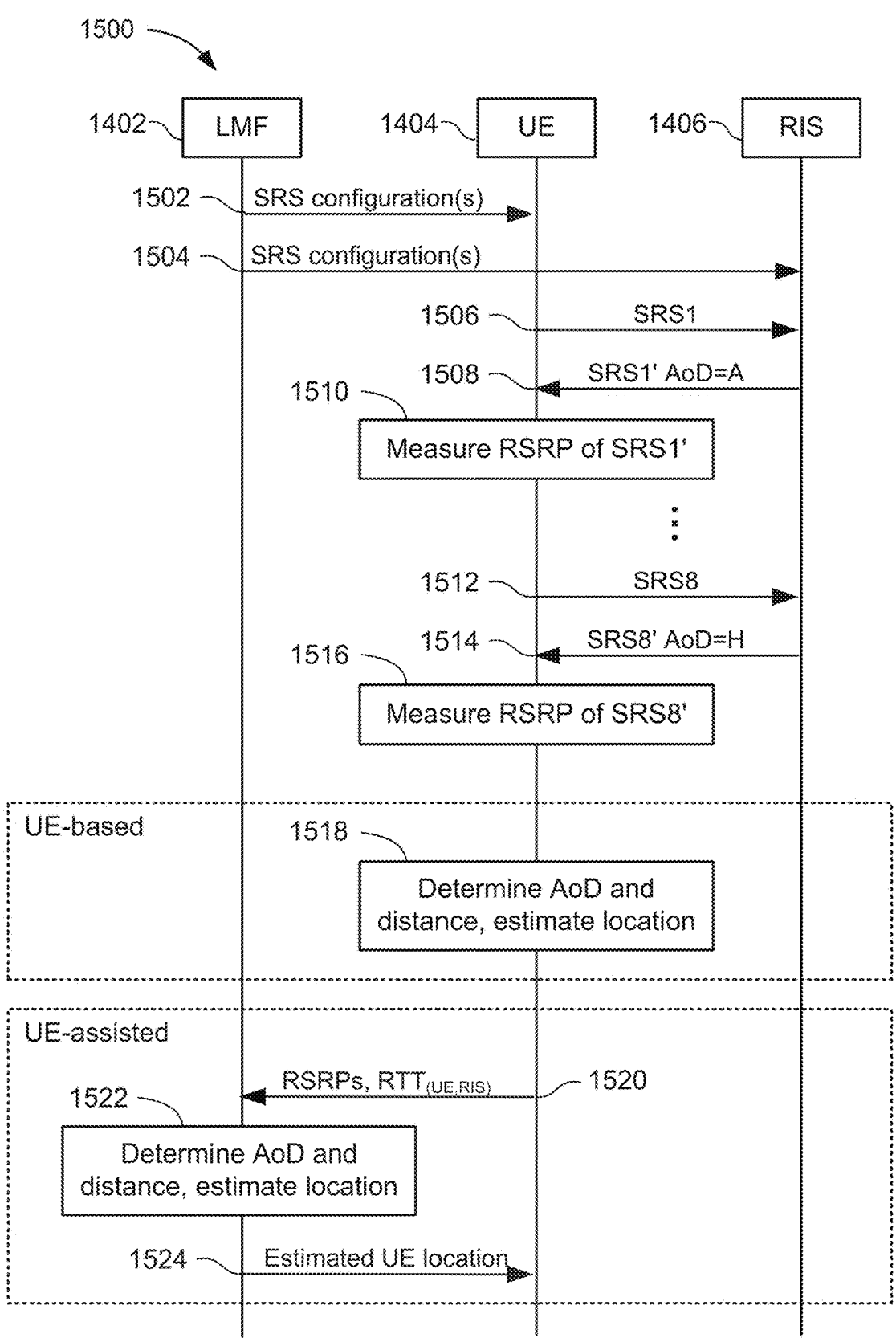
FIGS. 15 and 16 are signaling and event diagrams for RIS beam sweeping of SRS for UE-based AoD positioning according to some aspects of the disclosure.

FIG. 15 is a signaling and event diagram 1500 for RIS beam sweeping of SRS for UE-based AoD positioning according to some aspects of the disclosure. In FIG. 15, the process involves an LMF 1402 or other location server, a UE 1404, and a RIS 1406, and takes advantage of the fact that a RIS 1406 can adjust the direction that it reflects an incoming beam.

In the example shown in FIG. 15, the LMF 1402 sends an SRS configuration 1502 to the UE 1404 and sends an SRS configuration 1504 to the RIS 1406. The SRS configurations, which may be sent via radio resource control (RRC) messaging, identify SRS resources for positioning. Each SRS configuration may define one or more SRS resource sets, each SRS resource set containing one or more time-domain multiplexed (TDMed) SRS resources for positioning. In some aspects, each SRS resource for positioning may be defined in terms of slots and/or symbols. For example, there may be one SRS resource for positioning per slot; the SRS resource for positioning may occupy some or all of the symbols in the slot; the slots containing SRS resources for positioning may or may not be contiguous with each other, e.g., they could be every other slot, every third slot, or various patterns as needed to fit a TDD UL/DL configuration, and so on. The SRS configuration(s) may define occasions for the UE 1404 to transmit an UL-SRS to the RIS 1406, occasions for the RIS 1406 to reflect the UL-SRS back to the UE 1404, or combinations thereof. In some aspects, the SRS configuration for the RIS specifies an azimuth and/or elevation angle at which the reflected UL-SRS beams are to be transmitted. In the example shown in FIG. 15, the SRS configuration(s) SRS1' is to be transmitted by the RIS 1406 at an AoD of some angle "A", SRS2' is to be transmitted by the RIS 1406 at an AoD of some angle "B", and so on. Thus, in some aspects, the SRS configuration(s) 1110 may include a mapping of SRS occasion to reflection AoD.

In the example illustrated in FIG. 15, the UE 1404 then begins to transmit a series of UL-SRS signals to the RIS 1406. Every time the RIS 1406 receives an UL-SRS signal from the UE 1404, the RIS 1406 reflects the UL-SRS signal back to the UE 1404 at a different AoD according to a mapping provided by the SRS configuration(s) For example, The UE 1404 transmits SRS1 1506 to the RIS 1406, which reflects it as SRS1' 1508 at AoD=A, and the UE 1404 measures the RSRP of SRS1' (block 1510). This process repeats for each SRS, until the UE 1404 transmits SRS8

1512 to the RIS 1406, which reflects it as SRS2' 1514 at AoD=H, and the UE 1404 measures the RSRP of SRS8' (block 1516).

In a UE-based implementation, the UE 1404 then uses the measured RSRP values for SRS1' through SRS8' to determine an AoD of the UE 1404 from the RIS 1406 (block 1518), e.g., using techniques such as described for FIG. 6.

In a UE-assisted implementation, the UE 1404 may transmit the measured RSRP values 1520, and optionally a distance estimate based on RTT between the UE 1404 and the RIS 1406 or the RTT value itself, to a the LMF 1402. The LMF 1402 then uses this information to calculate the AoD and range from RIS to the UE, which the LMF then uses to estimate the location of the UE 1404 (block 1522). The LMF 1402 may then send the estimated location 1524 to the UE 1404.

If the RIS 1406 is performing as a passive mirror, where the time difference between receiving the SRS signal and reflecting the SRS signal is negligible, or if the propagation delay between the UE 1404 and the RIS 1406 is small, e.g., because they are close to each other, then the reflected SRS may arrive at the UE 1404 within the cyclic prefix (CP) length. In that scenario, the UE 1404 will need to have its receiver active to receive the reflected SRS at the same time that its transmitter is active to send the original SRS, which results in strong self-interference and uses more power than using only the transmitter or only the receiver. Another is that the UE 1404 may receive a reflected SRS from the environment before it receives the SRS reflected by the RIS 1406, and thus may be unable to differentiate between the multipath reflection and the RIS reflection. One approach to controlling this problem is shown in FIG. 16.

Figure 16:
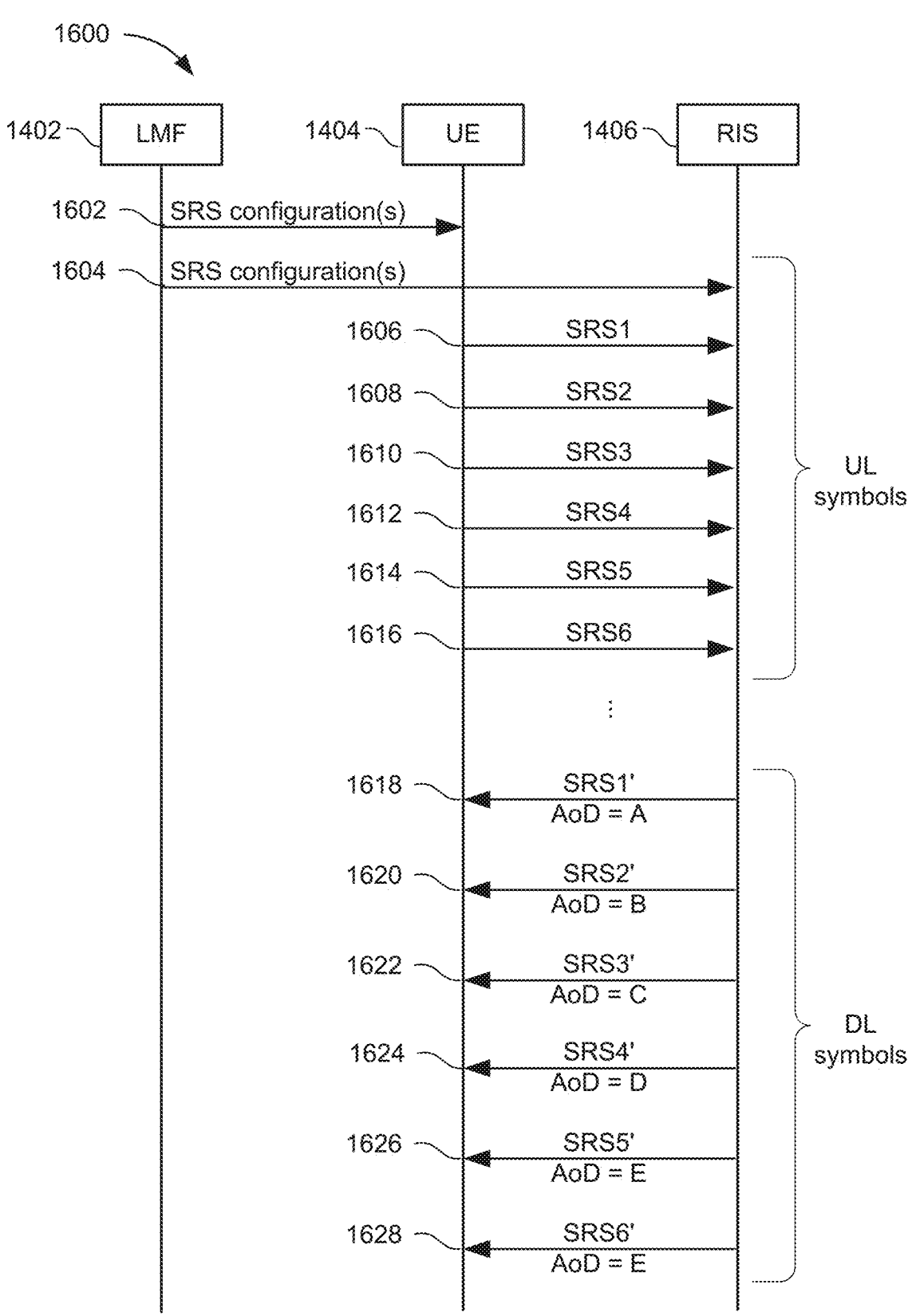

FIG. 16 is a signaling and event diagram 1600 for RIS beam sweeping of SRS for UE-based AoD positioning according to some aspects of the disclosure, including controlling when the RIS 1406 transmits the reflected signal. In this approach, there is an association between an SRS resource and a downlink slot or symbol to be used for the reflection of an SRS signal received by the RIS 1406 during the SRS resource, which may be provided to the UE 1404 via the SRS configuration(s) 1602 and to the RIS 1406 via the SRS configuration(s) 1604. In the example shown in FIG. 16, all of the SRS signals (e.g., SRS1 1606, SRS2 1608, SRS3 1610, SRS4 1612, SRS5 1614, SRS6 1616, . . . ) are transmitted before the RIS 1406 reflects them as SRS1' 1618, SRS2' 1620, SRS3' 1622, SRS4' 1624, SRS5' 1626, and SRS6' 1628, but in other aspects, each reflected SRS may be sent by the RIS 1406 before the UE 1404 sends the next SRS signal, but during specified DL slots or symbols. Other implementations are also possible, such as sending one or more SRS signals by the UE 1404, transmitting one or more reflected SRS signals by the RIS 1406, and sending one or more remaining SRS signals by the UE 1404, and so on. These examples are illustrative and not limiting.

In some aspects, for each SRS resource, its RIS reflection time, e.g., the delay between the time that the RIS 1406 receives the SRS and the time that the RIS 1406 transmits the reflected signal, should be controlled to make sure that the UE can observe the reflected SRS resource in a specific DL slot or DL symbols. Since gNB know the exact propagation time from gNB to RIS, it could configure the RIS's SRS reflection time to make sure the RIS is reflected in the associated DL symbol time span. In some aspects, the SRS reflection timing error should be within CP to avoid inter-symbol interference.

In some aspects, rather than specifying a delay value, a specific DL slot or symbol may be identified as the location in time when the RIS 1406 should transmit a particular SRS signal. Since a DL slot or symbol—normally reserved for use by the gNB to transmit to the UE—is being used instead by the RIS, in some aspects the UE could be signaled with a special slot format, e.g., one in which one or more specific DL symbols are dedicated for the reception of a specific SRS resource. The gNB would not transmit any DL signals in those specific DL symbols. In this approach, the SRS resource is associated with a specific DL symbol time span, and not associated with a particular DL reference signal or data/control channel, for example.

In some aspects, the UE could be provided with assistance data that includes "expected time to receive SRS resource" and "uncertainty of expected time to receive SRS resource" for reach SRS resource configured for the AoD estimation. For example, the assistance data could be similar to "expected-RSTD" and "expected-RSTD-uncertainty" associated with each pair of TRPs that transmit PRS. In some aspects, the "expected time to receive SRS resource" could be derived from the configuration of SRS and the RIS's time difference between receiving and reflecting a waveform. In some aspects, the "uncertainty of expected time to receive SRS resource" could be derived from the location of the RIS and the cell's coverage range. Where assistance data is involved, that assistance data could be signaled to the UE from an LMF or a gNB.

In some aspects, since a UE may not be aware of its relative angle with the RIS prior to the positioning operation the UE could use a wide-angle beam for its SRS transmissions. In some aspects, the UE could adjust the angle of the SRS transmission beams depending on how well the position of the RIS is known to the UE, e.g., starting with a wide beam to get a first location estimate, then using a narrower beam for subsequent use, e.g., to improve SINR of the SRS to the RIS.

The technique of using a RIS to beam-sweep a reflected SRS originally transmitted by a UE can be used for both a UE-assisted positioning mode and a UE-based positioning mode. In a UE-assisted mode, the UE may measure the RSRP for each SRS and report them through LPP protocol to the LMF, where the corresponding AoDs are estimated and the position calculation is performed. In a UE-based mode, the UE may measure the RSRP for each SRS and calculate the UE position with additional assistance data. These assistance data may include: the RIS geographic locations, the RIS orientation (to compute boresight direction), the azimuth and elevation of the RIS reflected SRS beam, the beam width of the RIS reflected SRS beam, and the boresight direction/beam-width uncertainty. For example, the beam-width could be the 3-dB beam-width, the 6-dB beam width, or the 12-dB beam-width, and could be specified for a particular spatial dimension, such as azimuth or elevation. The boresight/beam-width uncertainty could be 0.5-dB, 1-db, or 3-dB based measurement, and could also be specified for a particular spatial dimension.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a user equipment (UE), the method comprising: obtaining configuration information that identifies resources for sounding reference signal (SRS) positioning: transmitting, to a reconfigurable intelligent surface (RIS), a plurality of SRS transmissions at different times according to the configuration information: receiving, from the RIS, a plurality of SRS transmissions comprising reflections of the plurality of SRS transmissions to the RIS, wherein each of the plurality of SRS transmissions from the RIS is transmitted at a different angle of departure (AoD) from the RIS; measuring each of the plurality of SRS transmissions from the RIS to produce a plurality of measurements; and performing a positioning operation based on the plurality of measurements.

Clause 2. The method of clause 1, wherein obtaining the configuration information comprises receiving the configuration information via radio resource control (RRC) signaling.

Clause 3. The method of any of clauses 1 to 2, wherein obtaining the configuration information comprises receiving the configuration information from a network entity.

Clause 4. The method of clause 3, wherein receiving the configuration information from a network entity comprises receiving the configuration information from a location server.

Clause 5. The method of any of clauses 1 to 4, wherein the configuration information indicates a number of SRS resources, a time to transmit an SRS transmission to a RIS, an expected time to receive a reflection of an SRS transmission from the RIS, an uncertainty of an expected time to receive a reflection of an SRS transmission from the RIS, or combinations thereof.

Clause 6. The method of any of clauses 1 to 5, wherein each of the plurality of SRS transmissions from the RIS is received at a known time or received at a known delay after transmission of a corresponding SRS transmission to the RIS, according to the configuration information.

Clause 7. The method of any of clauses 1 to 6, wherein each of the plurality of SRS transmissions from the RIS comprises information that associates it to a corresponding SRS transmission of the plurality of SRS transmissions to the RIS.

Clause 8. The method of clause 7, wherein the information comprises an SRS ID, a beam ID, a known sequence, or combinations thereof.

Clause 9. The method of any of clauses 1 to 8, wherein performing a positioning operation based on the plurality of measurements comprises transmitting the plurality of measurements to a location server.

Clause 10. The method of clause 9, further comprising receiving, from the location server, a location estimate based on the plurality of measurements.

Clause 11. The method of any of clauses 1 to 10, wherein performing a positioning operation based on the plurality of measurements comprises determining an AoD of the UE from the RIS based on the plurality of measurements.

Clause 12. The method of clause 11, further comprising: receiving assistance data that comprises a geographic location of the RIS, an orientation of the RIS, characteristics of reflected SRS beams, or combinations thereof, wherein determining the AoD of the UE from the RIS based on the plurality of measurements comprises determining the AoD based on the plurality of measurements and the assistance data.

Clause 13. The method of clause 12, wherein characteristics of reflected SRS beams comprise an azimuth angle or beamwidth, an elevation angle or beamwidth, a boresight direction uncertainty, a beamwidth uncertainty, a transmission time uncertainty, or combinations thereof.

Clause 14. The method of any of clauses 11 to 13, further comprising estimating a location of the UE based on the AoD and a distance from the UE to the RIS.

Clause 15. A method of wireless communication performed by a reconfigurable intelligent surface (RIS), the method comprising: obtaining configuration information that identifies resources for sounding reference signal (SRS) positioning; receiving, from a user equipment (UE), a plurality of SRS transmissions at different times; and transmitting a plurality of SRS transmissions comprising reflections of the plurality of SRS transmissions received from the UE, wherein each of the plurality of SRS transmissions from the RIS are transmitted at a different angle of departure (AoD) from the RIS according to the configuration information.

Clause 16. The method of clause 15, wherein obtaining the configuration information comprises receiving the configuration information via radio resource control (RRC) signaling.

Clause 17. The method of any of clauses 15 to 16, wherein obtaining the configuration information comprises receiving the configuration information from a network entity.

Clause 18. The method of clause 17, wherein receiving the configuration information from a network entity comprises receiving the configuration information from a location server.

Clause 19. The method of any of clauses 15 to 18, wherein the configuration information indicates a number of SRS resources, an expected time to receive an SRS transmission from the UE, an uncertainty of an expected time to receive an SRS transmission from the UE, an expected time to send, to the UE, a reflection of an SRS transmission from the UE, an AoD at which to send a reflection of an SRS transmission from the UE, or combinations thereof.

Clause 20. The method of any of clauses 15 to 19, wherein each of the plurality of SRS transmissions comprising reflections of the plurality of SRS transmissions received from the UE comprises information that associates it to a corresponding SRS transmission of the plurality of SRS transmissions received from the UE.

Clause 21. The method of clause 20, wherein the information comprises an SRS ID, a beam ID, a known sequence, or combinations thereof.

Clause 22. A method of wireless communication performed by a location server, the method comprising: sending, to a reconfigurable intelligent surface (RIS), first configuration information that identifies resources for sounding reference signal (SRS) positioning; and sending, to a user equipment (UE), second configuration information that identifies resources for sounding reference signal (SRS) positioning, wherein each of the first configuration information and the second configuration information indicates a number of SRS resources, a time for the UE to transmit an SRS transmission to the RIS, an expected time for the UE to receive a reflection of an SRS transmission from the RIS, an uncertainty of an expected time for the UE to receive a reflection of an SRS transmission from the RIS, an angle of departure (AoD) at which the RIS transmits a reflection of an SRS transmission from the UE, or combinations thereof.

Clause 23. The method of clause 22, further comprising: sending, to the UE, assistance data that comprises a geographic location of the RIS, an orientation of the RIS, characteristics of reflected SRS beams, or combinations thereof.

Clause 24. The method of clause 23, wherein characteristics of reflected SRS beams comprise an azimuth angle or beamwidth, an elevation angle or beamwidth, a boresight direction uncertainty, a beamwidth uncertainty, a transmission time uncertainty, or combinations thereof.

Clause 25. The method of any of clauses 22 to 24, further comprising: receiving, from the UE, a plurality of reference signal received power (RSRP) values corresponding to a plurality of reflected SRS transmissions measured by the UE; determining an AoD of the UE from the RIS based on the plurality of RSRP values; estimating a location of the UE based at least in part on the AoD; and sending the estimated location to the UE.

Clause 26. An apparatus comprising a memory, at least one transceiver, and at least one processor communicatively coupled to the memory and the at least one transceiver, the memory, the at least one transceiver, and the at least one processor configured to perform a method according to any of clauses 1 to 25.

Clause 27. An apparatus comprising means for performing a method according to any of clauses 1 to 25.

Clause 28. A non-transitory computer-readable medium storing computer-executable instructions, the computer-executable comprising at least one instruction for causing a computer or processor to perform a method according to any of clauses 1 to 25.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), the method comprising:
   obtaining configuration information that identifies resources for sounding reference signal (SRS) positioning;
   transmitting, to a reconfigurable intelligent surface (RIS), a plurality of SRS transmissions at different times according to the configuration information;
   receiving, from the RIS, a plurality of SRS transmissions comprising reflections of the plurality of SRS transmissions to the RIS, wherein each of the plurality of SRS transmissions from the RIS is transmitted at a different angle of departure (AoD) from the RIS;
   measuring each of the plurality of SRS transmissions from the RIS to produce a plurality of measurements; and
   performing a positioning operation based on the plurality of measurements.

2. The method of claim 1, wherein obtaining the configuration information comprises receiving the configuration information via radio resource control (RRC) signaling.

3. The method of claim 1, wherein obtaining the configuration information comprises receiving the configuration information from a network entity.

4. The method of claim 3, wherein receiving the configuration information from the network entity comprises receiving the configuration information from a location server.

5. The method of claim 1, wherein the configuration information indicates a number of SRS resources, a time to transmit an SRS transmission to the RIS, an expected time to receive a reflection of the SRS transmission from the RIS, an uncertainty of an expected time to receive a reflection of the SRS transmission from the RIS, or combinations thereof.

6. The method of claim 1, wherein each of the plurality of SRS transmissions from the RIS is received at a known time or received at a known delay after transmission of a corresponding SRS transmission to the RIS, according to the configuration information.

7. The method of claim 1, wherein each of the plurality of SRS transmissions from the RIS comprises information that associates it to a corresponding SRS transmission of the plurality of SRS transmissions to the RIS.

8. The method of claim 7, wherein the information comprises an SRS ID, a beam ID, a known sequence, or combinations thereof.

9. The method of claim 1, wherein performing the positioning operation based on the plurality of measurements comprises transmitting the plurality of measurements to a location server.

10. The method of claim 9, further comprising receiving, from the location server, a location estimate based on the plurality of measurements.

11. The method of claim 1, wherein performing the positioning operation based on the plurality of measurements comprises determining an AoD of the UE from the RIS based on the plurality of measurements.

12. The method of claim 11, further comprising:

receiving assistance data that comprises a geographic location of the RIS, an orientation of the RIS, characteristics of reflected SRS beams, or combinations thereof, wherein determining the AoD of the UE from the RIS based on the plurality of measurements comprises determining the AoD based on the plurality of measurements and the assistance data.

13. The method of claim 12, wherein characteristics of reflected SRS beams comprise an azimuth angle, an azimuth beamwidth, an elevation angle, an elevation beamwidth, a boresight direction uncertainty, a beamwidth uncertainty, a transmission time uncertainty, or combinations thereof.

14. The method of claim 11, further comprising estimating a location of the UE based on the AoD and a distance from the UE to the RIS.

15. A method of wireless communication performed by a reconfigurable intelligent surface (RIS), the method comprising:

obtaining configuration information that identifies resources for sounding reference signal (SRS) positioning;

receiving, from a user equipment (UE), a plurality of SRS transmissions at different times; and transmitting a plurality of SRS transmissions comprising reflections of the plurality of SRS transmissions received from the UE, wherein each of the plurality of SRS transmissions from the RIS are transmitted at a different angle of departure (AoD) from the RIS according to the configuration information.

16. The method of claim 15, wherein obtaining the configuration information comprises receiving the configuration information via radio resource control (RRC) signaling.

17. The method of claim 15, wherein obtaining the configuration information comprises receiving the configuration information from a network entity.

18. The method of claim 17, wherein receiving the configuration information from the network entity comprises receiving the configuration information from a location server.

19. The method of claim 15, wherein the configuration information indicates a number of SRS resources, an expected time to receive an SRS transmission from the UE, an uncertainty of an expected time to receive the SRS transmission from the UE, an expected time to send, to the UE, a reflection of the SRS transmission from the UE, an AoD at which to send a reflection of the SRS transmission from the UE, or combinations thereof.

20. The method of claim 15, wherein each of the plurality of SRS transmissions comprising reflections of the plurality of SRS transmissions received from the UE comprises information that associates it to a corresponding SRS transmission of the plurality of SRS transmissions received from the UE.

21. The method of claim 20, wherein the information comprises an SRS ID, a beam ID, a known sequence, or combinations thereof.

22. A method of wireless communication performed by a location server, the method comprising:

sending, to a reconfigurable intelligent surface (RIS), first configuration information that identifies resources for sounding reference signal (SRS) positioning; and sending, to a user equipment (UE), second configuration information that identifies resources for SRS positioning, wherein each of the first configuration information and the second configuration information indicates a number of SRS resources, a time for the UE to transmit an SRS transmission to the RIS, an expected time for the UE to receive a reflection of the SRS transmission from the RIS, an uncertainty of an expected time for the UE to receive a reflection of the SRS transmission from the RIS, an angle of departure (AoD) at which the RIS transmits a reflection of the SRS transmission from the UE, or combinations thereof.

23. The method of claim 22, further comprising:

sending, to the UE, assistance data that comprises a geographic location of the RIS, an orientation of the RIS, characteristics of reflected SRS beams, or combinations thereof.

24. The method of claim 23, wherein characteristics of reflected SRS beams comprise an azimuth angle, an azimuth beamwidth, an elevation angle, an elevation beamwidth, a boresight direction uncertainty, a beamwidth uncertainty, a transmission time uncertainty, or combinations thereof.

25. The method of claim 22, further comprising:

receiving, from the UE, a plurality of reference signal received power (RSRP) values corresponding to a plurality of reflected SRS transmissions measured by the UE;

determining an AoD of the UE from the RIS based on the plurality of RSRP values;

estimating a location of the UE based at least in part on the AoD; and sending the estimated location to the UE.

26. A user equipment (UE), comprising:

a memory;

at least one transceiver; and at least one processor communicatively coupled to the memory and the at least one transceiver, the at least one processor configured to:

obtain configuration information that identifies resources for sounding reference signal (SRS) positioning;

transmit, via the at least one transceiver, to a reconfigurable intelligent surface (RIS), a plurality of SRS transmissions at different times according to the configuration information;

receive, via the at least one transceiver, from the RIS, a plurality of SRS transmissions comprising reflections of the plurality of SRS transmissions to the RIS, wherein each of the plurality of SRS transmissions from the RIS is transmitted at a different angle of departure (AoD) from the RIS;

measure each of the plurality of SRS transmissions from the RIS to produce a plurality of measurements; and perform a positioning operation based on the plurality of measurements.

27. The UE of claim 26, wherein, to obtain the configuration information, the at least one processor is configured to receive the configuration information via radio resource control (RRC) signaling.

28. The UE of claim 26, wherein, to obtain the configuration information, the at least one processor is configured to receive the configuration information from a network entity.

29. The UE of claim 28, wherein, to receive the configuration information from the network entity, the at least one processor is configured to receive the configuration information from a location server.

30. The UE of claim 26, wherein the configuration information indicates a number of SRS resources, a time to transmit an SRS transmission to the RIS, an expected time to receive a reflection of the SRS transmission from the RIS, an uncertainty of an expected time to receive a reflection of the SRS transmission from the RIS, or combinations thereof.

31. The UE of claim 26, wherein each of the plurality of SRS transmissions from the RIS is received at a known time or received at a known delay after transmission of a corresponding SRS transmission to the RIS, according to the configuration information.

32. The UE of claim 26, wherein each of the plurality of SRS transmissions from the RIS comprises information that associates it to a corresponding SRS transmission of the plurality of SRS transmissions to the RIS.

33. The UE of claim 32, wherein the information comprises an SRS ID, a beam ID, a known sequence, or combinations thereof.

34. The UE of claim 26, wherein, to perform the positioning operation based on the plurality of measurements, the at least one processor is configured to transmit the plurality of measurements to a location server.

35. The UE of claim 34, wherein the at least one processor is further configured to receive, via the at least one transceiver, from the location server, a location estimate based on the plurality of measurements.

36. The UE of claim 26, wherein, to perform the positioning operation based on the plurality of measurements, the at least one processor is configured to determine an AoD of the UE from the RIS based on the plurality of measurements.

37. The UE of claim 36, wherein the at least one processor is further configured to:

receive, via the at least one transceiver, assistance data that comprises a geographic location of the RIS, an orientation of the RIS, characteristics of reflected SRS beams, or combinations thereof, wherein, to determine the AoD of the UE from the RIS based on the plurality of measurements, the at least one processor is configured to determine the AoD based on the plurality of measurements and the assistance data.

38. The UE of claim 37, wherein characteristics of reflected SRS beams comprise an azimuth angle, an azimuth beamwidth, an elevation angle, an elevation beamwidth, a boresight direction uncertainty, a beamwidth uncertainty, a transmission time uncertainty, or combinations thereof.

39. The UE of claim 36, wherein the at least one processor is further configured to estimate a location of the UE based on the AoD and a distance from the UE to the RIS.

40. A reconfigurable intelligent surface (RIS), comprising:

a memory;

at least one transceiver; and at least one processor communicatively coupled to the memory and the at least one transceiver, the at least one processor configured to:

obtain configuration information that identifies resources for sounding reference signal (SRS) positioning;

receive, via the at least one transceiver, from a user equipment (UE), a plurality of SRS transmissions at different times; and transmit, via the at least one transceiver, a plurality of SRS transmissions comprising reflections of the plurality of SRS transmissions received from the UE, wherein each of the plurality of SRS transmissions from the RIS are transmitted at a different angle of departure (AoD) from the RIS according to the configuration information.

41. The RIS of claim 40, wherein, to obtain the configuration information, the at least one processor is configured to receive the configuration information via radio resource control (RRC) signaling.

42. The RIS of claim 40, wherein, to obtain the configuration information, the at least one processor is configured to receive the configuration information from a network entity.

43. The RIS of claim 42, wherein, to receive the configuration information from the network entity, the at least one processor is configured to receive the configuration information from a location server.

44. The RIS of claim 40, wherein the configuration information indicates a number of SRS resources, an expected time to receive an SRS transmission from the UE, an uncertainty of an expected time to receive the SRS transmission from the UE, an expected time to send, to the UE, a reflection of the SRS transmission from the UE, an AoD at which to send a reflection of the SRS transmission from the UE, or combinations thereof.

45. The RIS of claim 40, wherein each of the plurality of SRS transmissions comprising reflections of the plurality of SRS transmissions received from the UE comprises information that associates it to a corresponding SRS transmission of the plurality of SRS transmissions received from the UE.

46. The RIS of claim 45, wherein the information comprises an SRS ID, a beam ID, a known sequence, or combinations thereof.

47. A location server, comprising:

a memory;

at least one transceiver; and at least one processor communicatively coupled to the memory and the at least one transceiver, the at least one processor configured to:

send, via the at least one transceiver, to a reconfigurable intelligent surface (RIS), first configuration information that identifies resources for sounding reference signal (SRS) positioning; and send, via the at least one transceiver, to a user equipment (UE), second configuration information that identifies resources for SRS positioning, wherein each of the first configuration information and the second configuration information indicates a number of SRS resources, a time for the UE to transmit an SRS transmission to the RIS, an expected time for the UE to receive a reflection of the SRS transmission from the RIS, an uncertainty of an expected time for the UE to receive a reflection of the SRS transmission from the RIS, an angle of departure (AoD) at which the RIS transmits a reflection of the SRS transmission from the UE, or combinations thereof.

48. The location server of claim 47, wherein the at least one processor is further configured to:

send, via the at least one transceiver, to the UE, assistance data that comprises a geographic location of the RIS, an orientation of the RIS, characteristics of reflected SRS beams, or combinations thereof.

49. The location server of claim 48, wherein characteristics of reflected SRS beams comprise an azimuth angle, an azimuth beamwidth, an elevation angle, an elevation beamwidth, a boresight direction uncertainty, a beamwidth uncertainty, a transmission time uncertainty, or combinations thereof.

50. The location server of claim 47, wherein the at least one processor is further configured to:

receive, via the at least one transceiver, from the UE, a plurality of reference signal received power (RSRP) values corresponding to a plurality of reflected SRS transmissions measured by the UE;

determine an AoD of the UE from the RIS based on the plurality of RSRP values;

estimate a location of the UE based at least in part on the AoD; and send, via the at least one transceiver, the estimated location to the UE.

\* \* \* \* \*